US008799755B2

(12) United States Patent
Krause

(10) Patent No.: US 8,799,755 B2
(45) Date of Patent: *Aug. 5, 2014

(54) ELECTRONIC TEXT READING ENVIRONMENT ENHANCEMENT METHOD AND APPARATUS

(76) Inventor: Philip R Krause, Potomac, MD (US)

( * ) Notice: Subject to any disclaimer, the term of this patent is extended or adjusted under 35 U.S.C. 154(b) by 1162 days.

This patent is subject to a terminal disclaimer.

(21) Appl. No.: 12/710,316

(22) Filed: Feb. 22, 2010

(65) Prior Publication Data

US 2010/0153889 A1    Jun. 17, 2010

Related U.S. Application Data

(63) Continuation of application No. 09/628,727, filed on Jul. 28, 2000, now Pat. No. 7,669,111, which is a continuation of application No. 09/015,660, filed on Jan. 29, 1998, now Pat. No. 6,154,757.

(60) Provisional application No. 60/036,305, filed on Jan. 29, 1997.

(51) Int. Cl.
    *G06F 17/00*    (2006.01)
(52) U.S. Cl.
    USPC .......................................... 715/200; 715/255
(58) Field of Classification Search
    USPC ........................................ 715/200, 255, 256
    See application file for complete search history.

(56) References Cited

U.S. PATENT DOCUMENTS

| 4,939,689 | A | * | 7/1990 | Davis et al. ............................. 1/1 |
| 5,146,552 | A | * | 9/1992 | Cassorla et al. ............... 715/234 |
| 5,444,615 | A | * | 8/1995 | Bennett et al. ................. 704/251 |
| 5,603,021 | A | * | 2/1997 | Spencer et al. ......................... 1/1 |
| 5,621,871 | A | * | 4/1997 | Jaremko et al. ................ 345/441 |
| 5,689,666 | A | * | 11/1997 | Berquist et al. ................ 715/797 |
| 5,757,370 | A | * | 5/1998 | Amro et al. .................... 715/787 |
| 6,148,311 | A | * | 11/2000 | Wishnie et al. ................ 715/205 |
| 6,189,019 | B1 | * | 2/2001 | Blumer et al. ................. 715/205 |
| 6,850,963 | B1 | * | 2/2005 | Adachi et al. .................. 709/203 |
| 7,137,062 | B2 | * | 11/2006 | Kaufman et al. .............. 715/200 |
| 7,143,348 | B1 | * | 11/2006 | Krause ............................ 715/236 |
| 7,222,306 | B2 | * | 5/2007 | Kaasila et al. ................. 715/801 |
| 7,308,641 | B2 | * | 12/2007 | Shaw et al. .................... 715/243 |
| 7,539,940 | B2 | * | 5/2009 | Yalovsky et al. .............. 715/270 |
| 2002/0074396 | A1 | * | 6/2002 | Rathus et al. .................. 235/380 |
| 2005/0154690 | A1 | * | 7/2005 | Nitta et al. ........................ 706/46 |
| 2010/0114911 | A1 | * | 5/2010 | Al-Kofahi et al. ............ 707/748 |
| 2012/0137223 | A1 | * | 5/2012 | Nicol et al. .................... 715/730 |

OTHER PUBLICATIONS

Storey et al., Manipulating and Documenting Software Structures, IEEE 1995, pp. 275-284.*

* cited by examiner

*Primary Examiner* — Cong-Lac Huynh

(57) ABSTRACT

An apparatus, method and article of manufacture of the present invention provide an enhanced user interface for a computer system that maximizes a reader's ability to rapidly comprehend a text. The invention provides a dynamically presented outline of the text, such that the reader maintains a sense of location within the entire text. Additional information about the text and results of operations on the text are presented on the corresponding portions of the outline.

20 Claims, 27 Drawing Sheets

FIGURE 1. Computer system amendment
cabinet
citizen
Congress
Constitution
government
House of Representatives
President
Vice-president
Senate
Supreme Court
veto Figure 3. Sample wordlist File --402
        Load parameter set --420
        Load recent parameters --422
        Save parameter set --424
        Save parameter set as . . . --426

Page setup --428
        Print --430
        Print selection --432

Quit --434

Figure 4A. File Menu

Edit --404
    Backtrack --436

Copy --438
    Select All --440

Show all parameters --442
    Shortcuts --444
        Assign shortcut key --445
        List shortcuts --447
    Make toolbar --446
    Interview --448
    Create/edit wordlist --450
    Quiz --452

Figure 4B. Edit Menu

Display --406
    New Block --454
        Text --> designate source
        Outline --> designate linked text, whether to generate or load
        Information
    Delete Block --456
    Shape --458
        Rectangle
        Circle
        Oval
        Other
    Block attributes --460
        Foreground
        Background
        Page/Block location
    Text Attributes --462
        Font
        Size
        Style
        Color
        Justification
        Line spacing
        Word/letter spacing
        Margins
        Line/sentence numbering
    Display size --464
        Maximum
        Minimum
        Default Characters
        syllables
        words
        clauses
        sentences
        paragraphs Figure 4C. Display menu and submenus Text toolbar --403
    Preread --409
        Assess text --466
        Create concordance --468
            Schema parameter input
                Wordlist
                Repetitions
                Display order
            Schema results
                Reference
                Select
                More
                Wordlist (save)

Figure 4D. Text toolbar, Preread menu & submenus

Text toolbar --403
    Links --417
        Reference --470
             Select reference works --4701
            Input --4702
                Wordlist
                Part of speech
                Type
                Select
            Lookup mode --4703
                Predefined modes
                User-defined modes
            Display --4704
        Annotations --472
            List available annotation types for display
            Editing mode --4721
        Same text --474
            Figures
            Tables
            Footnotes
            Endnotes
            Links within text
        External --476
            Network
            Internet
        Location (defined for each displayed link) --478
            Text body/Margin toggle
            Display lines to link
            Describe location in text
    Annotation list --419
        (list annotation types for display in this list)
        (list annotations of selected types)

Add to wordlist --411

Figure 4E. Text toolbar with Links, Annotation List, Add to wordlist menus and submenus

Text toolbar --403
    Highlight/skip --421
        Encoding --480
            Parts of speech
            Links
            Lists
            Location on page
        Skip/Include --482
            Skip --4821
                All text
                Parts of speech --4822
                Links
                Lists
                Location on page
            Include --4823
                All text
                Parts of speech
                Links
                Lists
                Location on page
        Cursor --484
            Visual
            Audio
        Attributes (defined for each type of highlight/skip) --486

Figure 4F. Text toolbar with Highlight/skip menu & submenus

Text toolbar --403
    Advance --423
        Select display type ---488
            Scroll toggle
            Block toggle
                Don't erase previous
        Select speed --490
            Manual --4901
                change selected key
            Text presentation --4902
                letter-by-letter
                word-by-word
                cluster-by-cluster
            Constant --4903
                If block
                    Interval
                    WPM
                    CPM
                If scroll
                    Lines/minute
                    WPM
                    CPM
            Variable --4904
                Variable-faster --4907
                Variable-slower --4908
                Variable-difficulty --4909

Speed up (show key) --4905
                Rate
            Slow down (show key) --4906
                Rate
    Sequencing --492
        Options Figure 4G. Text toolbar with Advance menu and submenus.

Text toolbar --403
    Modes --425
        Auto-annotate --4251
        List of user-defined parameter sets Annotate --427
        Change category- show current selected --4271
            List categories --4272
            New category --4273
        Add --4274
            Mark --4275
            Text (include provision for deletion of pre-existing text) --4276
                editing tools
            Audio --4277
            Link --4278
                video
                network
                program
                same document
                different document
        Remove --4279

Figure 4H. Text toolbar with Modes and Annotate menus and submenus

Information toolbar items --431
    Reading speed --4311
    Location (incl. Page number from original text, etc.) --4312

Figure 4I.   Information toolbar

Outline toolbar --429
        Include (things to select for inclusion) --4291
                Titles
                Chapters
                Headings
                Figures
                Tables
                Index
                Footnotes
                Endnotes
                Search results
                Reverse indexing
                -- other things, depending on what's defined Size (information on size of items in outline) --4292
        Select --4293
               on outline
                on related text elsewhere on outline
                      all items at same level
                      all items at higher level
                      all items at lower level
                      all items directly above
                      all items directly below
                      invert
        Go to text --4294
        Collapse --4295
                Entire outline
                all below current level
                hide all below selected items
                Current location
        Expand --4296
                Entire outline
                All above current level in outline
                Next level
                All below selected items
        Show/Hide outline arrows (toggle)--4297
        Advance --4298

Figure 4J. Outline toolbar with menus and submenus

Search --412
    Find --4121
        Find all
        Forward
        Backward
        Reference
    Find again --4122
    Reverse Index --4123
        Distance from current location to search
            (unless text is selected)
    Display results --4124
        On outline (which outline)/on text
    Attributes --4125
        Font
        Style
        Color
        Size Audio --414
    Music --4141
    Other sounds --4142

Windows --416

Help --418

Figure 4K. Search, Audio, Windows, and Help menu and submenus

The _____ is composed of members chosen every second year by people of the several states, and the electors in each State must have the qualifications requisite for electors of the most numerous branch of the State legislature.

a) Senate
b) Supreme Court
c) President
d) House of Representatives
e) Congress

Next

Figure 6. Sample Quiz Question

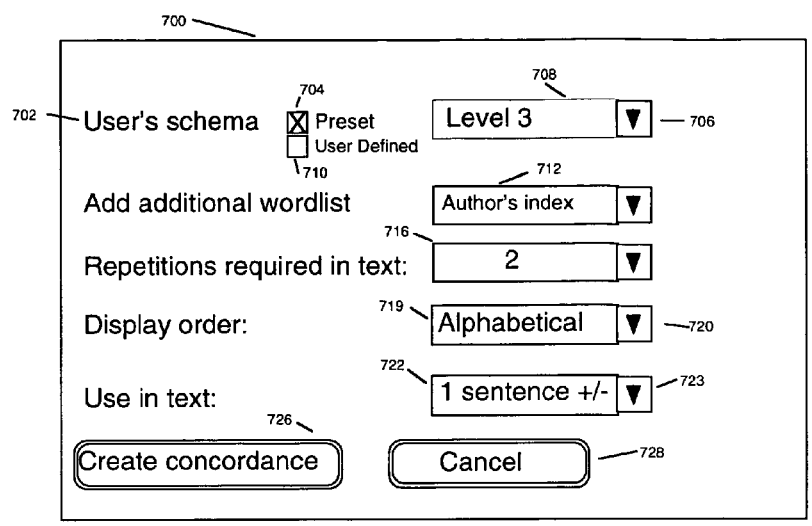
Figure 7. Create concordance dialog box

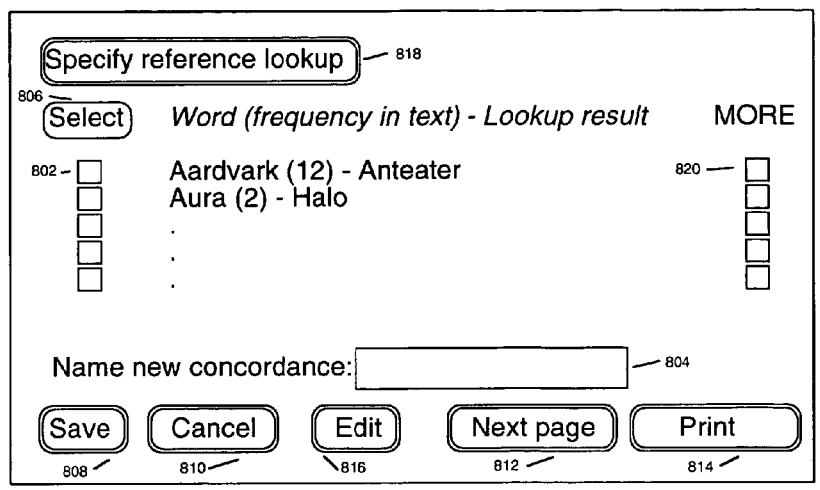
Figure 8. Sample concordance result dialog box

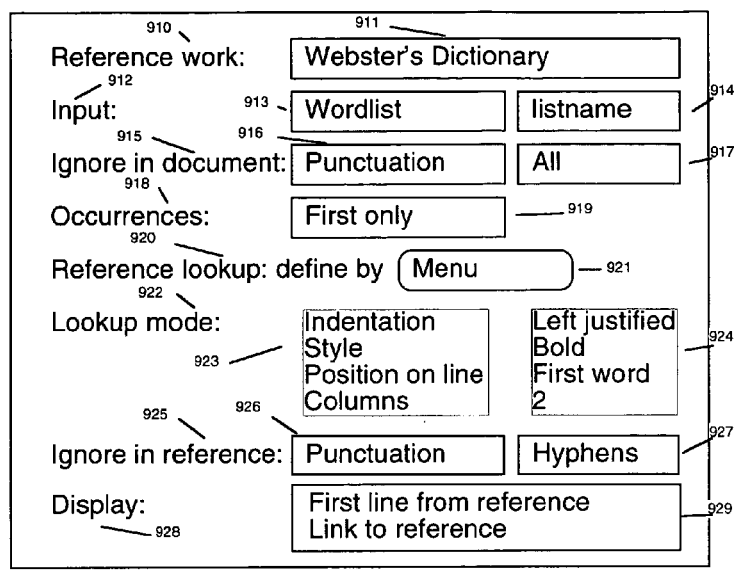
Figure 9. Reference look up dialog box

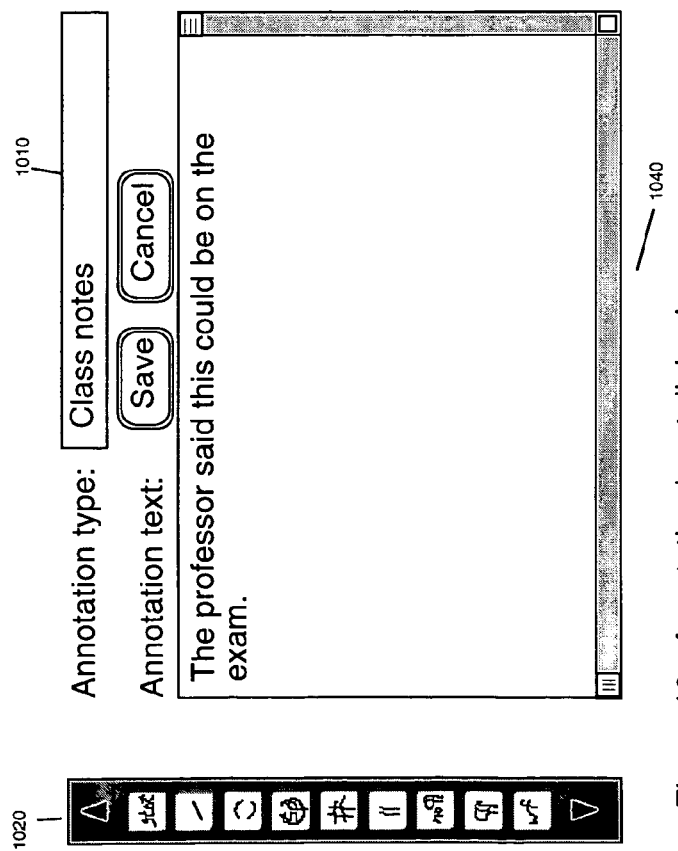
Figure 10. Annotation input dialog box

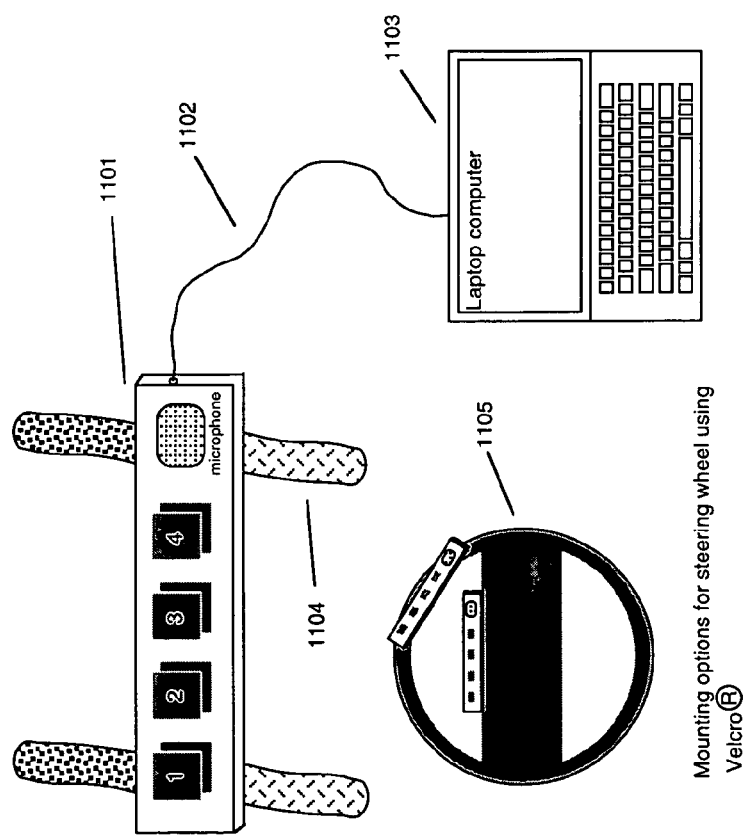
Figure 11. Automobile keyboard

File  Edit  Display  Annotate  Search  Audio  Windows  Help

Text
(Preread) (Links) (Annotation List) (Add to wordlist) (Highlight/skip)

These cases will sufficiently suggest the proper rule of decision for others[1] [[1]IN COOLEY, CONST. LIM., CH. 5, IS A LARGE COLLECTION OF AUTHORITIES ON THIS SUBJECT].

*The Departments of Government.* - The Constitution of the United States creates three departments of government, and directly or by implication determines their powers.

*The Legislature.* - All the legislative powers granted by the Constitution are vested in a Congress consisting of a Senate and House of Representatives[2] [[2]U.S. CONSTITUTION, ARTICLE I. § 1.], subject to a qualified veto in the President. The House of Representatives is composed of members chosen every second year by the people of the several states, and the electors [elector: one who votes] in each State must have the qualifications requisite for electors of the most numerous branch of the State legislature[3] [[3]U.S. CONSTITUTION, ARTICLE I. § 2.]. Each State will determine for itself what these qualifications shall be.

[Class notes: The professor said this could be on the exam] No person can be a representative who has not attained the age of twenty-five years, and been seven years a citizen of the United States, or who at the time is not an inhabitant of the State in which he is chosen.

→ 1210

Text
(Add to wordlist) (Highlight/skip) (Advance) (Modes)

Representatives are apportioned among the States according to their respective numbers, counting the whole number of persons in each State, excluding Indians not taxed[1] [[1]U.S. CONSTITUTION, AMENDMENT 14, § 2. NOTE THE QUALIFICATION IN THE LATTER PART OF THE SECTION].

The Senate is composed of two senators from each State, chosen by the legislature thereof for six years, and divided into three classes, so that one class is chosen every second year. If vacancies happen, by resignation or otherwise, during the recess of the legislature of any State, the executive thereof may make temporary appointments until the next meeting of the legislature, which shall then fill such vacancies[2] [[2]U.S. CONSTITUTION, ARTICLE I. § 3.].

No person shall be a senator who shall not have attained the age of thirty years and been nine years a citizen of the United States, and who shall not, when elected, be an inhabitant of the State from which he shall be chosen[3] [[3]U.S. CONSTITUTION, ARTICLE I. § 3.].

The House chooses its own Speaker, and other officers[4] [[4]U.S. CONSTITUTION, ARTICLE V. § 2.]. The Vice-President of the United States is President of the Senate, but without a vote except in case of equal division. The Senate

Figure 12a.

ELECTRONIC TEXT READING ENVIRONMENT ENHANCEMENT METHOD AND APPARATUS

RELATED APPLICATIONS

This application is a continuation application of application Ser. No. 09/628,727, filed Jul. 28, 2000, U.S. Pat. No. 7,669,111 which was a continuation application of application Ser. No. 09/015,660 filed Jan. 29, 1998 (now U.S. Pat. No. 6,154,757), which was based on Provisional Application No. 60/036,305 filed Jan. 29, 1997, to which priority under 35 U.S.C. §119(e) is claimed. The specifications of Ser. Nos. 09/015,660 and 60/036,305 are incorporated herein by reference.

FIELD OF THE INVENTION

This invention relates generally to the field of information processing and display by computers and human-machine interfaces for computer systems, and more particularly to a computer-implemented method for optimizing a user's reading environment based on the user's personal reading style and requirements. Thus, the computer program of this invention provides increased functionality to display of electronic text, thereby enhancing the reader's speed, comprehension, and sense of location within the text. The invention also provides simplified access to secondary reference sources in a manner that minimizes interference with reading the primary text, and permits the user to interactively create a separate concordance document based on information from the primary text and secondary reference sources. In addition, the invention enhances a reader's ability to read interactively for example by providing improved means for annotating a text and for moving around within a text. Finally, the invention can be used to check comprehension by means of computer-generated quizzes.

BACKGROUND OF THE INVENTION

Despite the advent of the electronic age, the preferred method of reading today is by far to read a text printed on paper, or hard copy, even though electronic versions of the same text are available at lower cost. Indeed, rather than moving to a paperless society as once envisioned, the electronic age has resulted in the use—and waste—of even more paper than before, as word processors and laser printers generate more and more drafts of the same document, and printing information of all kinds from the Internet can be accomplished with a single mouseclick.

The reasons that people prefer to read text in hard copy are varied. Many readers, accustomed to reading the printed page, are uncomfortable with computers. Others believe that computers will never replace the ability to flip through the pages of a book, at a pace selected by the reader. Although one can simulate the process of flipping through a book electronically, screen display limitations and the need for a manual interface with a computer usually make simulated flipping much less satisfactory than actually having the book in hand.

Reading a paper text, however, suffers from numerous limitations and disadvantages. First, the proliferation of paper texts where electronic texts are available has resulted in a serious waste of paper, and constitutes a threat to the environment in terms of loss of trees, as well as loss of resources and pollution attendant the disposal or even recycling of paper.

Second, there is no ability to search a paper text for key words or phrases without looking at every single page—a laborious process that one can never be sure was accomplished successfully. Searching using index entries in paper text can be tedious and frustrating. The reader often loses continuity in reading by having to flip back and forth between the text and the index when moving from one page cited by the index reference to the next such page.

Third, paper can get lost, whereas electronic text can be stored on any of a number of electronic media (with inexpensive backup copies depending on the importance of the document).

Fourth, proliferation of many documents can constitute a threat to confidentiality where confidentiality is important. Access to sensitive electronic texts can be limited only to those with a genuine need.

Fifth, the manual task of reading—including page turning, and holding the text the optimum distance from one's eyes, can often interfere with the smoothness of the reading experience.

Sixth, in a long document read sequentially, there is often a tendency in the reader to lose focus and concentration, and as a result to experience wide fluctuations in reading speed and comprehension. While many readers have heard that "active" reading facilitates comprehension, it is very easy to lapse into periods of inactive or passive reading at great cost in terms of comprehension and speed.

Seventh, often when a reader runs across unfamiliar words or concepts, the reader finds herself turning to secondary sources in order to decode the author's meaning, at considerable loss of time and concentration. Although recent art, such as U.S. Pat. No. 5,359,514 to Manthuruthil, ameliorates this to some extent by providing known synonyms to replace words that exceed a user's reading level, such programs can become a crutch which prevents the user from improving her reading level and actually learning new material.

Eighth, where it is necessary or desirable to take notes, the options available to a hardcopy reader are unsatisfactory. Such as reader typically has the option of writing annotations in margins that may not be big enough to accommodate the annotation, or to take notes on a separate piece of paper that may not be available when the reader requires it.

Ninth, individuals suffering reading or vision disabilities often find it difficult or impossible to read paper texts where the print is too small, or too faint, or where letters are too closely spaced.

While most computer displays have means of searching for key terms or phrases—an invaluable enhancement when reading for research purposes—this enhancement is of little benefit to a reader wishing to read a book, such as a novel, sequentially. In addition, in a large text it is difficult for the reader to discern the context or location within the text of the results of such a search. There is thus a need for a more flexible approach to displaying electronic text that overcomes the disadvantages of paper text as well as the disadvantages of electronic text as it exists today.

Furthermore, the continuing popularity of books and courses on speed reading attests to the fact that many people wish to enhance their reading speed in terms of ability to comprehend more material in a shorter period of time.

The present invention derives from the observation that each individual reader has a unique way of approaching a written text. Each written text in turn provides particular challenges to the reader that depend on the reader's approach. Approaches that readers bring to a text include, but are not limited to, the number of words or characters seen in a given eye fixation, eye movements, use of hands to assist eye movements, propensity for eye fatigue, schema (the preexisting knowledge that the reader brings to the text), level of literacy, level of familiarity with the language or organization of the text, ability to visualize while reading, interest in the material, deadline (external or internal) for completing the reading, purpose of reading (research to answer particular question, pleasure, or general desire to increase store of knowledge), use of music or other background sound (such as a metronome or an occasional beep) to enhance reading pleasure or speed, types of music or background sound preferred for enhancing pleasure or speed of reading a particular text, vision difficulties, and reading disabilities.

OBJECTS AND SUMMARY OF INVENTION

The present invention permits the use of a computer system to display an electronic text, including linked computer-readable elements (e.g., additional text, graphics, audio, motion pictures), in terms of parameters chosen by the user. One object of the present invention is to permit a user of a computer system equipped with an appropriate display device to read a text that is displayed in accordance with that reader's particular reading preferences.

Another object of the present invention is to permit the reader to interactively determine his or her preferred means of reading a particular electronic text, or genre of texts.

Another object of the present invention is to provide a means for displaying an electronic text in accordance with the particular needs or preferences of the user.

Another object of the present invention is to permit a reader of an electronic text to maximize the speed and comprehension with which he reads the material.

Another object of the present invention is to provide the ability to display text from multiple different sources in accordance with the reader's preferences. These include, but are not limited to, texts obtained by scanning a paper text into an electronic text, texts obtained by downloading from the Internet, texts on CD-ROM or other computer storage devices, and texts in other computer programs which include display of text as a part of their functionality.

Another object of the present invention is to provide links to other material, such as dictionaries (including foreign language dictionaries for foreign texts), glossaries, encyclopedias, treatises in the field, or annotations. These links can be used to create a concordance to supplement a reader's schema (or preexisting knowledge) either prior to reading a text, while reading a text, or after reading a text. Such links may be defined by the author of the text, a reader of the text, or the computer program itself based on characteristics inherent to the text.

Another object of the invention is to facilitate use of an author's index by allowing immediate skipping from one indexed page to the next.

Another object of the present invention is to save paper that would otherwise be needlessly wasted in the printing of text that could be read as electronic text.

Another object of the present invention is to provide a training tool for enabling a reader to maximize his reading speed.

Another object of the present invention is to provide a tool for overcoming or mitigating reading disabilities such as dyslexia, poor vision, and physical disabilities such as an inability to turn pages.

Another object of the present invention is to provide a reader the ability to have certain words stand out from less important words. At the user's option, this distinction can be based on parts of speech, such as the nouns or verbs that constitute the backbone of a text. Alternatively, specific words can be emphasized based on their location within the text or location on the computer display.

Another object of the present invention is to permit a user to "preread" an electronic text, either by reading only headings, certain sentences, or certain parts of speech, such as nouns and verbs, or any combination of the above.

Another object of the present invention is to provide the ability for a reader to preview a text by viewing topic headings accompanied by supplemental information such as index entries and text as specified by the user.

Another object of the present invention is to facilitate reading or skimming of textual material gathered by an "agent" program from the Internet or other types of networks while the user is not present.

Another object of the present invention is to teach reading skills to beginning and intermediate readers.

Another object of the present invention is to enhance the ability of electronic text to serve as a means for learning a foreign language.

Another object of the present invention is to provide a vocabulary building tool.

Another object of the present invention is to improve the reader's sense of location within the text according to his or her preferences.

According to the present invention, as embodied and broadly described herein, a method for using a computer system to enhance a user's reading environment according to the user's preferences or requirements is provided. In a preferred embodiment, the text to be displayed may be selected by the user by specifying the location that the text occupies on a memory device accessible by the computer. In another preferred embodiment, the text to be displayed is already incorporated in a computer program.

According to the method, in a preferred embodiment, the user provides information to a computer system through a parameter input process regarding a plurality of parameters that relate to the presentation of text. By displaying the text in accordance with these parameters, the computer program permits the user to determine his or her optimal reading environment and provides this environment to the user for his or her reading enjoyment. Elements of the reading display that the computer program permits the user to control include: the speed of presentation, the screen location of presentation, the mode of display for information associated with the text, including linked objects, outlines, and the results of searches.

In addition, the invention permits the user to annotate a text, and to display the user's and other users' annotations in a context designated by the user. The invention also provides an enhanced annotation capability whereby the reader is able to annotate a text without changing the screen display or otherwise being distracted by the need to make additional keystrokes.

In addition, according to the method, means are provided whereby the user can interactively create a concordance to a text. According to the method, the user provides information to a computer system through a parameter input process regarding a plurality of parameters that relate to the user's comprehension of the text. Using the parameter values thus selected by the user, the computer program draws on the primary text and secondary reference texts to create a concordance that the reader can review before, during or after reading to enhance her comprehension of the text, or of other texts involving similar subject matter.

Also, according to the present invention, a computer system comprising means for effectuating the method of the present invention is provided. Further according to the present invention, computer-readable memory encoded with a program directing a computer system to effectuate the method of the present invention is also provided.

Additional objects and advantages of the invention are set forth in part in the description that follows, and in part are obvious from the description, or may be learned by practice of the invention. The objects and advantages of the invention may also be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate particular embodiments of the invention, and together with the description, serve to explain the principles of the invention.

FIG. 3 is an illustration of a sample wordlist, which may be used in conjunction with the display of text as described in the specification.

FIGS. 4A-4K depict the menus and submenus that can be accessed from the display depicted in FIG. 4.

FIG. 6 is an illustration of a quiz generated by the invention using the text shown in FIG. 4 in conjunction with the wordlist shown in FIG. 3.

FIG. 7 is an illustration of a display screen showing a create concordance dialog box permitting the user to enter values for parameters for use by the computer program to identify words or phrases in the text to be included in the concordance.

FIG. 8 is an illustration of a concordance result dialog box permitting the user to view and edit the concordance created through use of the create concordance dialog box.

FIG. 9 is an illustration of a display screen showing a "reference lookup" dialog box permitting the user to specify a reference work for lookup of specified text units, the criteria by which the presence of the text unit in the reference work triggers a match, criteria which the text unit must meet to trigger the lookup, and the desired information from the reference work.

FIG. 10 is an illustration of a display screen showing an "annotation input" dialog box permitting the user to input annotations of a text, including proofreader's marks.

FIG. 11 is an illustration of an "automobile keypad", which is designed to perform prespecified functions on a connected laptop computer while being used by the driver of an automobile.

DETAILED DESCRIPTION OF THE PREFERRED EMBODIMENTS

Figure 1:
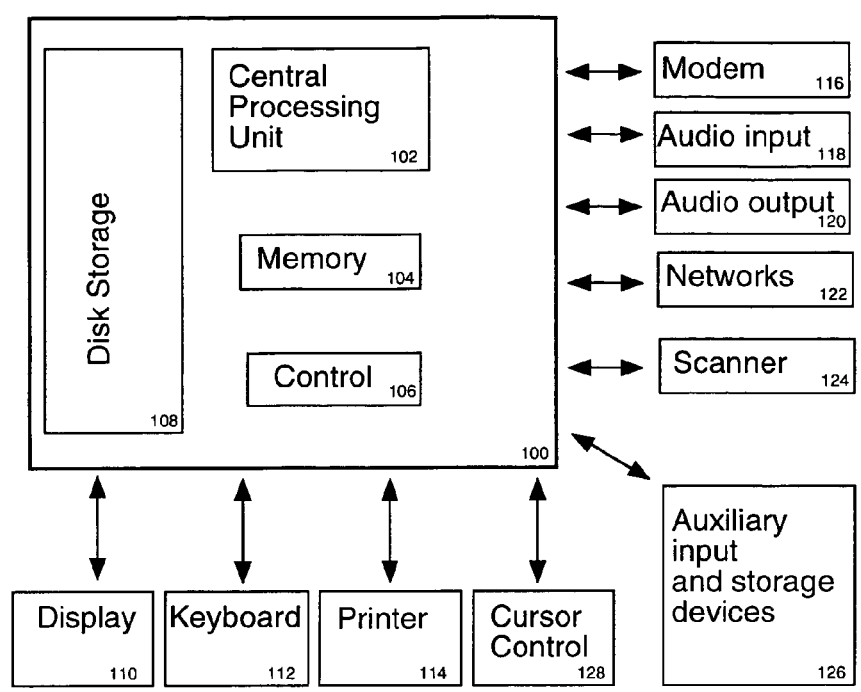
FIG. 1 is a block diagram of a computer system as may be utilized by the present invention.

A computer system as may implement and execute the present invention is described with reference to FIG. 1. Such a computer system generally may comprise a processing means (102), such as a central processing unit (CPU), for processing information; a memory (104) for storing information and instructions for the processor, preferably including a dynamic storage means (such as random access memory (RAM)) and a static storage means (such as read-only memory (ROM)); a data storage device (108) such as a magnetic disk and disk drive for storing information and instructions; a control means (106) for controlling input/output operations and the interaction between the processor (102) and the memory; a display device (110) such as a cathode ray tube, projector, or liquid crystal display for displaying a cursor and information to the computer user; an alphanumeric input device (112), such as a keyboard, including alphanumeric and other keys for communicating information and command selections to the processor (102); and a cursor control device (128), such as a point-and-click mouse device, trackball, joystick, or light pen, for communicating information and command selections to the processor (102) and for controlling cursor movement. Other input devices including microphones (118), scanners (124), video, touch sensitivity and galvanic skin response sensors may also be used. The system may also include computer hardware and loudspeakers or headphones appropriate for generating audio output (120). It is useful if the system includes a hardcopy device (114), such as a printer, for providing permanent copies of information. Finally, the system may include a modem (116) for communicating with computer systems at remote locations, or a connection to a server for communicating with computer networks (122) including the Internet.

Figure 2:
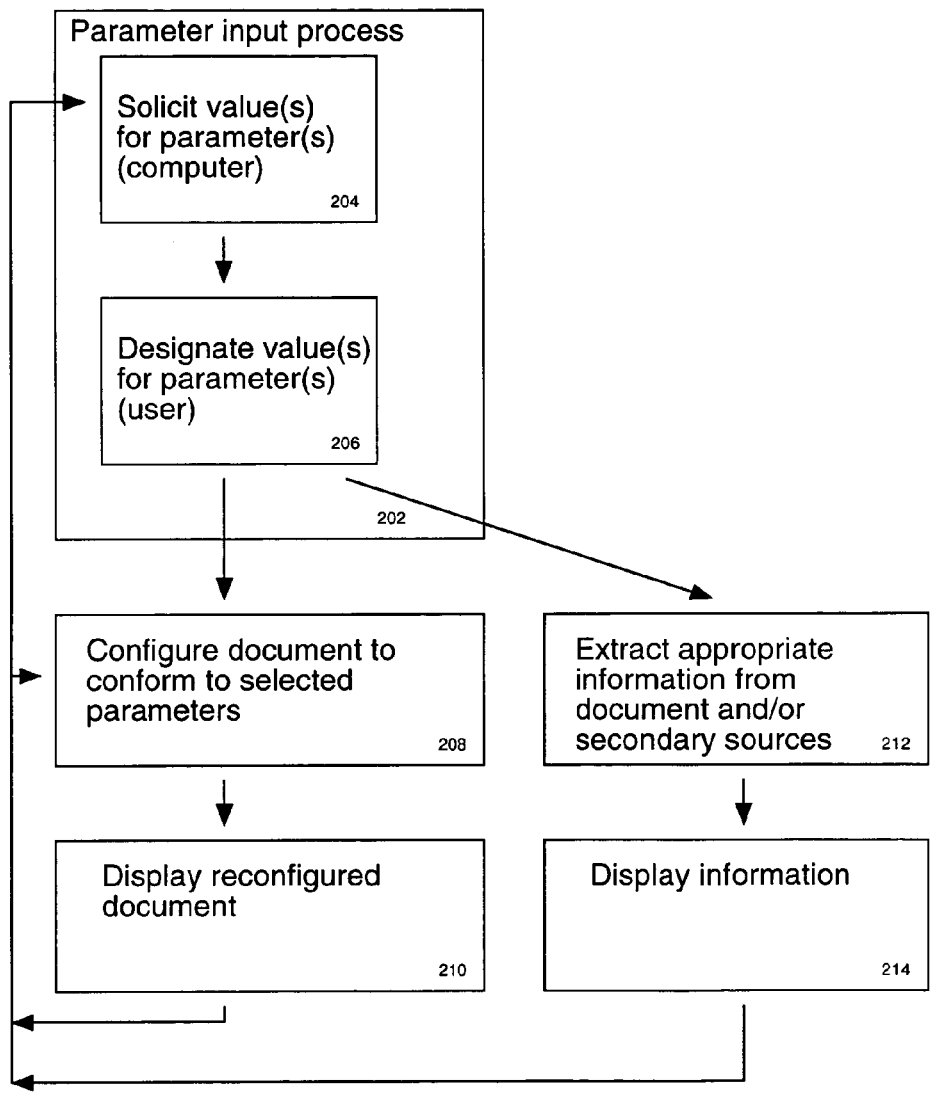
FIG. 2 is a flow diagram showing the overall operation of the present invention.

FIG. 2 is a flow diagram depicting the overall operation of the invention. While the invention can be practiced in a manner different from that depicted in the flow diagram, the flow diagram provides a useful overview for understanding the invention.

The invention involves, among other things, the use of a computer system, such as depicted in FIG. 1, to display electronic text stored in the computer system or stored external to the computer system. As shown in FIG. 2, the invention comprises the steps of collecting parameter input from the user (202); using the computer system to convert an electronic text to be presented in accordance with the parameter values selected (208); and using the computer system to display the text in accordance with the parameter values selected (210). In addition, after collection of parameter input (202) related to information to be extracted from the electronic text and secondary references, the computer system may extract the specified information (212) and display that information for the user (214).

"Parameter input", as used elsewhere in this description, is defined as the process of obtaining information regarding desired parameters from the user (202). This may be accomplished via dialog boxes, tool bars, use of predefined keystrokes, collection of audio, video, or other electronically codable input from the user for the purpose of assigning values to parameters related to optimizing the user's reading environment. The parameters can relate to the display of text—such as the rate of text advance, amount of text displayed on the screen, size and font of characters. A different set of parameters—such as the user's reading level and secondary reference sources to be used—relates to the creation of the concordance. In a preferred embodiment, the computer system is equipped with Windows™ software and suitable display and point-and-click mouse devices well known in the art to enable a user to signal the computer system using the point-and-click mouse device.

The step of parameter input (202) in FIG. 2 preferably may be accomplished by use of a point-and-click device, such as a mouse, or an appropriate predefined or user-defined shortcut key or keys, or a combination thereof. For some parameters, clicking on the parameter name provides a "slide bar" or other graphical means that permits the viewer to view any or all values for that parameter by simple mouse action such as sliding the cursor along the slide bar. This method also permits the user to rapidly assess the effect which changes in some parameters have on the display, because the display can be set to change according to parameter values tentatively selected by this method. Thus, in a preferred embodiment the text displayed on the screen varies as new parameter values are assigned. In another preferred embodiment, when values for all parameters have been selected, using the parameter input process, the computer will format the selected electronic text. In another preferred embodiment, the computer system determines the user's preferred parameter values by means of an interactive interview.

FIG. 3 depicts an exemplary wordlist, which may be used to enhance the utility of a document to its user. A wordlist is a listing of text units such as words, phrases, or names that can be used by the computer program to enhance the user's reading environment. As used herein, the phrase "text unit" refers to words, phrases, names, and the like such as might appear in a wordlist. Several of the functions of this invention are the result of the use of wordlists that can for example be part of the computer program, generated from the text with or without user input, created by the user, or created by the author of the text being read or another text. Thus, in a preferred embodiment, the create concordance function, described at more length below, among other things, compares a wordlist corresponding to the user's knowledge level to a wordlist created from the text being read. The quiz function similarly involves the use of a wordlist in conjunction with the text to create a quiz. Functions related to the display of text also rely on wordlists to identify specific text units to be encoded and displayed differently from surrounding text.

Figure 14:
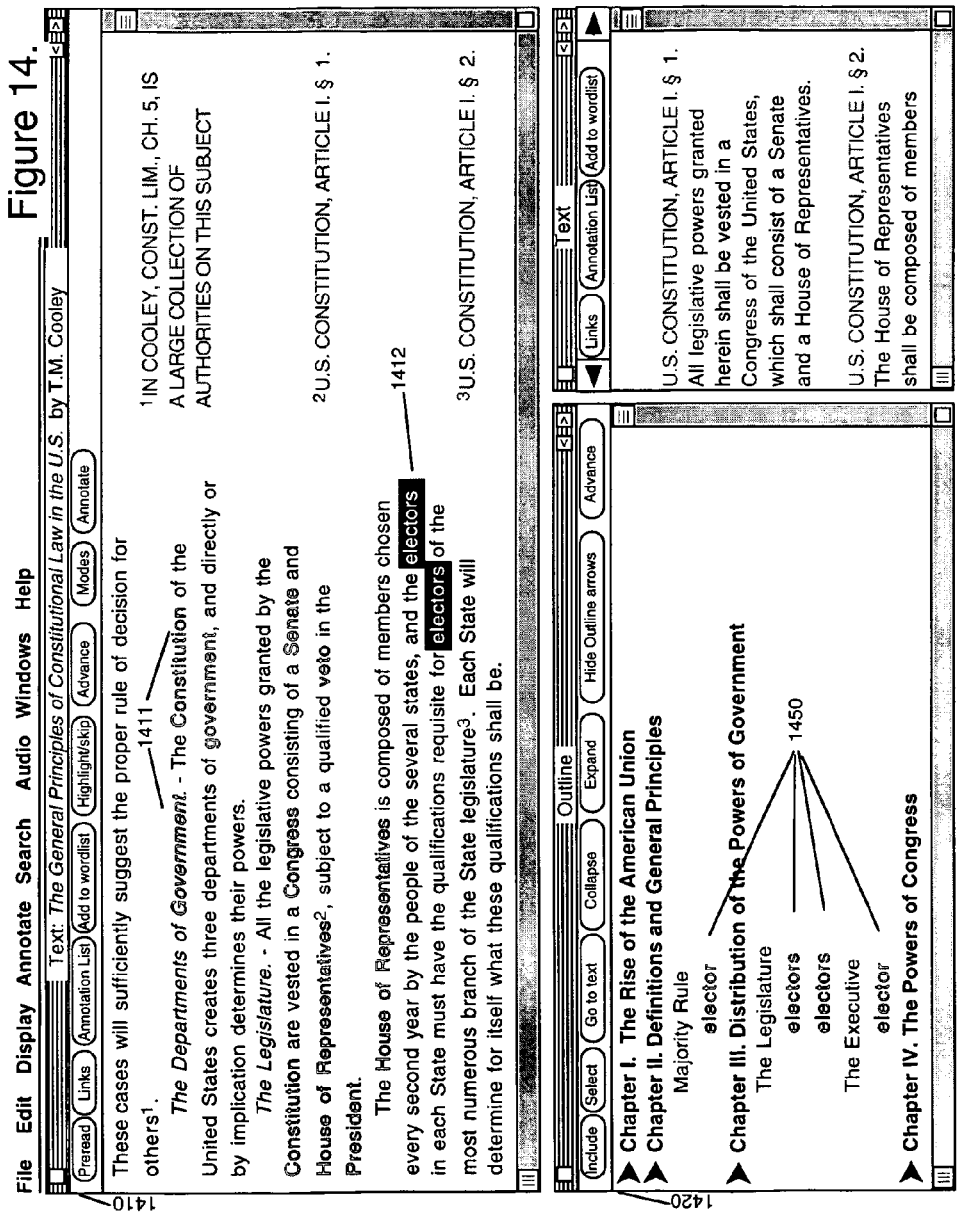

The text units shown in the wordlist of FIG. 3 are the basis for the document-based quiz shown in FIG. 6, and for further encoding and display of text units as illustrated by FIG. 14. A wordlist similar to the one depicted in FIG. 3 may also trigger lookup of the text units in a dictionary or other reference work. The wordlist illustrated in FIG. 3 is a relatively short wordlist, and may have been the author's index, or may have been generated by the computer by comparing a wordlist of the text units of the text with a wordlist containing text units known to the user in accordance with the "create concordance" function described below. Other kinds of wordlists may include text units corresponding to a specified vocabulary level, or include only text units at a specified vocabulary level which do not appear in lists of text units at lower vocabulary levels. Wordlists may be constructed by the invention, or may be supplied together with the invention by the manufacturer or an editor.

In a preferred embodiment, a wordlist that seeks to represent the text units known to the user is constructed by means of the computer program by means of an interview and test format initiated by the computer program. In this embodiment, the computer program has access to a master wordlist that includes substantially all text units that exceed a certain threshold level of importance in the language of the text (prepositions, pronouns, articles and the like typically do not meet this threshold). Combining information obtained from the user in an interview format relating to the user's educational, vocational and/or professional background, as well as the user's stated interests, with information gathered as a result of testing the user by the computer, the computer system is able to generate a wordlist consisting of all text units above a certain threshold level of importance with which the reader is assumed to be familiar.

Figure 4:
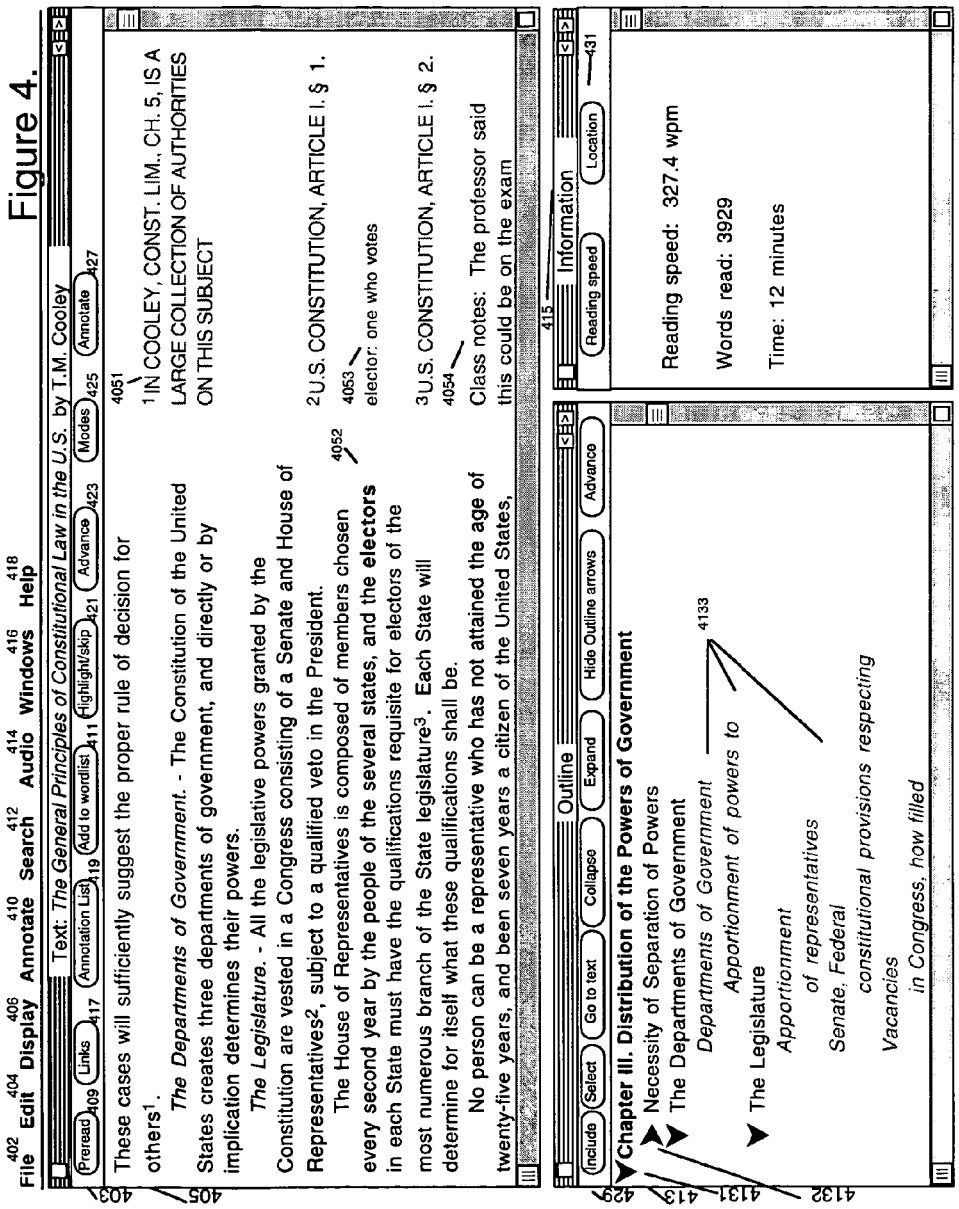
FIG. 4 is an illustration of a typical display screen that a user may encounter while reading a text using the present invention.

FIG. 4 depicts a typical display screen for reading using the present invention. In a preferred embodiment, the words "File" 402, "Edit" 404, "Display" 406, "Annotate" 410, "Search" 412, "Audio" 414, "Windows" 416 and "Help" 418 appear as a toolbar across the top of the screen. In the preferred embodiment depicted in FIG. 4, text block 405 has associated with it a text toolbar 403, containing icons Preread 409, Links 417, Annotation List 419, Add to wordlist 411, Highlight/Skip 421, Advance 423, Modes 425, and Annotate 427. Clicking on any of these words or icons in either of these toolbars then calls up a menu of additional possible functions, important examples of which are depicted in FIGS. 4A-4H.

In the preferred embodiment depicted in FIG. 4, the computer screen display may comprise three different types of blocks: "Text", "Outline", and "Information". Text block 405 contains material from a specific text being read by the user, and may also include information derived from links related to that text. When creating a text block, the user specifies the computer file(s) containing the desired text or texts. "Outline" blocks, such as outline block 413, refer to material displayed in a text block, and contain direct references to material in or related to the text. When creating an outline block, the user specifies which text or texts are referred to by the outline, and whether the user desires the computer to generate an outline by reference to material in the text. Alternatively, the outline may be loaded from a predefined file, for example, one supplied by the author or an editor of the text. An "Information" block, such as information block 415, contains information about the user's reading speed, location within the text, or other information relevant to the reading of text. More details regarding the use of these blocks is provided below, with specific reference to the toolbars associated with each type of block.

In some embodiments, some of the block assignments are preselected, so a computer program of this invention can be have a specific text associated with it.

The "File" Menu

In a preferred embodiment, clicking "File" 402 on the screen depicted by FIG. 4 displays a pulldown menu as depicted in FIG. 4A offering the following choices: "Load parameter set" 420, "Load recent parameters" 422, "Save parameter set" 424, "Save parameter set as . . . " 426, "Page setup" 428, "Print" 430, "Print selection" 432 and "Quit" 434.

In a preferred embodiment, selecting an operation relating to parameters, such as "Load parameter set" 420 causes the computer system to prompt the user to specify the parameter set that is intended. Selecting the "Load parameter set" option 420 calls up a menu displaying names that have been selected by the user or users to represent different sets of assigned values for the parameters that define the reading display, as well as a plurality of presets that have been created by the manufacturer of the software. In a preferred embodiment, the user may select from a plurality of suites of parameter default values preset by the manufacturer and named appropriately to reflect the reading style or purpose for which they are intended. Thus, a reader constructing her own preferred reading environment may start from the default suite that most closely matches her style or purpose. For example, preexisting presets might include levels 1-10, with increasing levels corresponding to increased reading speed in terms of text block display and screen interval. Clicking on one of these set names resets the assigned values of the parameters to the values saved when that set was created.

"Load recent parameters" 422 provides the user access to a user-predefined number of recently used parameter sets, from which the user may select one for easier access to frequently used parameter sets.

In a preferred embodiment, each parameter used in this invention has a default value (where the default value may include dormancy) that has been preselected by the manufacturer. After the user has selected values for each parameter for a particular type of parameter by means of an interview process, direct entry, or dialog boxes, she can save them by selecting "Save parameter set" 424. This signals the computer to image a dialog box that prompts the user to name the particular set of parameters that he has just created. Thus, a reader may create different parameter presets for technical reading than for leisure reading, and may create a very different parameter preset for use in skimming or scanning material. In addition, in a preferred embodiment, each user of the software will be able to store his or her preferred parameter values for different kinds of reading.

"Page setup" 428, "Print" 430, and "Quit" 434 have the normal function ascribed to these options in Windows™ programs. For example, in a preferred embodiment, selecting "Quit" 434 initiates the process whereby the user signals the computer system on which the embodiment is implemented to stop executing the embodiment. Selecting "Print" 430 causes the computer system to query the user via a dialog box to determine precisely what is to be printed. For a display containing more than one functional block (such as a text block, an outline block, or an information block, all discussed below), the dialog box may require the user to specify which block is to be printed. "Print selection" 432 permits the selective printing of a region from the viewed text which has been pre-selected by a point and click device. Selection of material from a document may be made either by direct point-and-click action on the document itself, use of the "Select All" function discussed below, or, as described below in the description of the "Outline Toolbar", by point-and-click action on an outline which refers to that document. "Print Selection" 432 box also permits the user to specify which material referred to within the selection (e.g., associated figures, tables, and references) is to be printed.

The "Edit" Menu

In a preferred embodiment, the "Edit" menu, as depicted in FIG. 4B, includes "Backtrack" 436, "Copy" 438, "Select All" 440, "Show all parameters" 442, "Shortcuts" 444, "Make toolbar" 446, "Interview" 448, "Create/edit Wordlist" 450, and "Quiz" 452.

Clicking on "Backtrack" 436 enables the user to return to previously viewed locations in a document, in the reverse order viewed by the user. This function permits users who follow links within documents or outlines to other locations in the document, and then desire to return to their previous reading position.

"Copy" 438 permits the user to copy selected regions of text from a document to the operating system's clipboard or other analogous memory buffer, for insertion into other programs or documents accessible to the operating system. Selection of material from a document may be made either by direct point-and-click action on the document itself, by use of the "Select all" function 440, by reference to sentence or line numbers of material for selection, or, as described below in the description of the "Outline Toolbar", by point-and-click action on an outline which refers to that document.

In a preferred embodiment, clicking "Select All" 440 causes the entire document (or the document referred to by an outline) to be selected for further operations. Portions of a document may also be selected by direct point-and-click action on the document, or indirectly by point-and-click action on an outline referring to the document. Operations for which portions or all of a document may be selected include printing, copying (including to an annotation or a separate document), highlighting, searching, reverse indexing, sorting, and construction of concordances.

Selecting "Show all parameters" 442 provides the user with access to a dialog box or group of dialog boxes which display the value of each parameter discussed in the description of the invention and permits the user to change any or all parameter values.

Clicking "Shortcuts" 444 provides the user access to "Assign shortcut key" 445 and "List shortcuts" 447. In a preferred embodiment, for each parameter, the user has the option of assigning shortcut keys for the purpose of changing the parameter without reference to a dialog box.

"Assign shortcut key" 445 permits the user to assign shortcut keys or key combinations to any function discussed in this description of the program. This is accomplished by first selecting "Assign shortcut key" 445, and then selecting a function using the menus and the point-and-click device. The program then queries the user regarding which key she would like to assign to the operation. If the key chosen has already been assigned, the program permits the user to alter this selection.

The user also may define shortcut keys which automatically advance the text display to selected types of items (e.g., headings of different levels, paragraphs, sentences, pages, specific characters or groups of characters).

"List shortcuts" 447 provides the user with a dialog box listing all defined shortcut keys, and an opportunity to change any of them by use of the dialog box.

FIG. 4 depicts exemplary toolbar 403 for text block 405. Returning to FIG. 4B, "Make toolbar" 446 permits the user to create or edit toolbars for display in any block or across the top of the entire display, permitting more direct point-and-click access to program parameters while viewing the text. Additional elements may thus be added to pre-defined toolbars (e.g., the text, outline, or information toolbars), and the order of display of icons in these toolbars may be rearranged. Assignment of elements to the toolbar is performed in a manner similar to that of "shortcut key" assignment. The user also has the option of adding direct reference to specific saved parameter sets to a toolbar, permitting rapid switching between parameter sets when a reader changes his or her mode of reading. In a preferred embodiment, placing a cursor on an icon within a toolbar also signals the computer system to display a brief text description of the function to be executed when the icon is clicked. For example, in text toolbar 403 depicted in FIG. 4, placing a cursor on the "Advance" icon 407 in the "text toolbar" 403 causes the text "Define mode of text advance" to appear at the bottom of the screen.

In a preferred embodiment, the computer program also provides means for interactively selecting a preferred reading environment using the "Interview" function 448, available on the edit menu depicted in FIG. 4B. This is done in response to questions posed by the computer program, in the form of an interview, where each parameter—and the effects of varying each parameter—are explained by text or audio/visual displays, including displays of a sample text block modified in accordance with the parameter under discussion.

"Create/edit wordlist" 450 permits the user to construct or change a wordlist, as depicted in FIG. 3 and described above. On the menu depicted in FIG. 4B, clicking on "Create/edit wordlist" 450 permits the user to type in words to be placed in a wordlist, and add or subtract words to pre-existing wordlists. In addition, while reading a text, as depicted in FIG. 4, the user may add words to a wordlist by use of the "Preread" 409 and "Add to wordlist" 411 functions accessible from the "Text" toolbar 403.

In the preferred embodiment depicted in FIG. 4B, selecting "Quiz" 452 initiates a quiz comprising questions and fill in the blanks about the text to allow the reader to test her reading comprehension. This quiz may be derived by the invention based on elements provided in a text in parallel structure, or be provided as a part of the document by the author. FIG. 6 depicts a typical quiz question that may be generated by the computer program on the basis of the wordlist of FIG. 3. Using computer programming techniques well known to those with skill in the art, the computer system is programmed to select a sentence from the text in which the word from the wordlist plays a prominent role. Thus, as in the example depicted on FIG. 6, the program displays a portion of the text to the user, but with a blank line in place of a word from the wordlist. In a preferred embodiment, multiple choices from the wordlist are provided as possible answers to the question. Alternatively, the reader may be required to fill in the blank. In a preferred embodiment, multiple blanks may appear in a single quiz question, thereby challenging the reader to recall more of what she had read. In a preferred embodiment, a different type of wordlist-based quiz provides the user with multiple choice questions regarding the definition of words from a selected wordlist, based on a reference work selected by the user. Definitions of other words from the wordlist are provided as possible wrong answers. These quiz options permit the user to use the program to aid in the user's memorization of information from the text, and are especially helpful in the context of vocabulary-building or learning a foreign language.

The "Display" Menu and Submenus

In the preferred embodiment depicted in FIGS. 4 and 4C, the "Display" menu includes "New Block" 454, "Delete Block" 456, "Shape" 458, "Block Attributes" 460, "Text Attributes" 462, and "Display Size" 464, and submenus associated with these functions.

In a preferred embodiment, it is possible for the user to indicate via a graphical interface the precise desired locations on the screen of all components of the display. To do so, the user selects "New Block" 454 and uses the cursor control device to specify a location on the display screen where a block is to be placed, and its size.

For the following functions that can be accessed from the "Display" menu, as depicted in FIG. 4C, the attributes designated apply to a block, as defined using the "New Block" function 454. The block that is influenced by changes in these parameters may be selected using a point and click device.

"Delete Block" 456 permits the suppression of a block and information associated with that block from the display. If the user does not desire to completely delete this information or access to the material referred to by that block, but also does not wish to view it constantly, the user may also select the "Display size" function 464 (described below), which permits the user to minimize the screen size used by this block.

The "Shape" function 458 permits the user to define the shape of the selected block. Blocks are normally rectangular in shape, but may also comprise other four-sided shapes, triangles, circles, ellipses, or other shapes.

In addition, under "Block Attributes" 460 by selecting "Foreground" 4601 and "Background" 4602, the user may specify foreground and background colors for each block. For ease of editing, the location of blocks may be changed using a cursor control device.

In a preferred embodiment, "Text Attributes" 462 comprises parameters relating to typeset, such as font, size, style (e.g., bolding, small caps), color, justification on a line, margins, line spacing, word spacing, letter spacing, line numbering, and sentence numbering.

In a preferred embodiment, "Display Size" 464 comprises parameters that relate to the size of the text block. Under this parameter grouping, the user may specify the maximum size, the minimum size, and the default or normal size for each created block. This can be done by inputting numbers corresponding to the size or through use of a point and click device directly upon the block, or upon a slide bar representing a dimension of the block. In addition, the user may resize a block at any time through use of a point and click device. For example, in the case of a rectangular block, assigning values for height and width is one way to determine the dimensions of the text block. The definition of the block size at any given time represents the maximum space which text associated with that block will occupy on the display screen. Within this constraint, the dimensions of the text block displayed at any given time may be further constrained by assigning values to some other parameters, such as characters, syllables, words, clauses, sentences, and paragraphs. These other parameters may be defined in terms of the number (maximums and minimums) of each of them which are displayed per block or per line at any one time. This permits the size of the text block to vary from screen to screen, within the constraints of the dimensions assigned to it. As depicted in FIG. 4, the arrows in the upper-right hand corner of a block may be used to cause the block to be displayed at its maximum size, its default size, or its minimum size. The size of the block is increased or decreased by one step in this hierarchy by clicking on the upward or the downward arrow, respectively.

As described above in the case of blocks, but more generally in the context of other parameters used in this invention, the values of some parameters may be dependent on others. If one such value is changed, other parameters with a dependency are changed by the program in a manner consistent with their dependency. In a preferred embodiment, conflicts between user-selected parameters, where one choice is inconsistent with another, are resolved in priority order, giving precedence to the most recently changed parameter. For example, the user may designate a number of words per text block that will not fit within the specified number of characters per text block. In such a case, the program presents the text in accordance with the most recently assigned parameters.

The "Text Toolbar"

As depicted in FIG. 4, the "Text toolbar" 403 is displayed on text blocks, such as text block 405. Toolbar 403 provides access to parameters specific to the display of text by the program. In the preferred embodiment depicted in FIG. 4, this toolbar comprises the following options: "Preread" 409, "Links" 417, "Annotation list" 419, "Add to wordlist" 411, "Highlight/skip" 421, "Advance" 423, "Modes" 425, and "Annotate" 427. If the block on which a toolbar is displayed is not wide enough to accommodate the entire toolbar, as in the case of the text blocks depicted in FIG. 12(a) arrows 1210 are displayed which permit the user to scroll horizontally through the items in the toolbar. The toolbar may be modified to include any of the other functions or parameters defined by the program, as described above in the section on the "Edit" menu.

In the preferred embodiment depicted in FIG. 4, clicking on Preread icon 409 causes the program to display a "Preread menu," such as that depicted in FIG. 4D. In a preferred embodiment, the Preread menu comprises the selections "Assess Text" 466 and "Create Concordance" 468. Clicking "Assess Text" 466 causes the computer to assess the selected portion of the text for difficulty, based on the vocabulary associated with wordlists provided with the computer program. These wordlists contain text units associated with different vocabulary levels. The presence in a text of text units in a given wordlist causes the text to be assessed at a level of difficulty associated with that wordlist. The computer provides the user information regarding the number of text units at each reading level which appear in the text. This assists the user in determining how to adjust her presets for display of text as well as of links to references for the current text. A method for assessing the difficulty of a text is described in U.S. Pat. No. 4,456,973, the specification of which is incorporated herein by reference.

Selecting "Create concordance" 468 signals the computer to display a concordance dialog box, as depicted in FIG. 7. The "concordance" function assists the reader to generate a customized wordlist (called a concordance herein) that includes text units of importance to the user, and for each text unit, provides supplemental information such as definitions (for text units identified as being unknown to the user), biographical information (for names), examples of usage in the primary text, and examples of usage in secondary texts. Thus, a concordance, as that term is used herein, is a special type of wordlist, based both on the text and on at least one other wordlist, which may provide relatively limited or quite detailed information about the text units therein listed.

Figure 5:
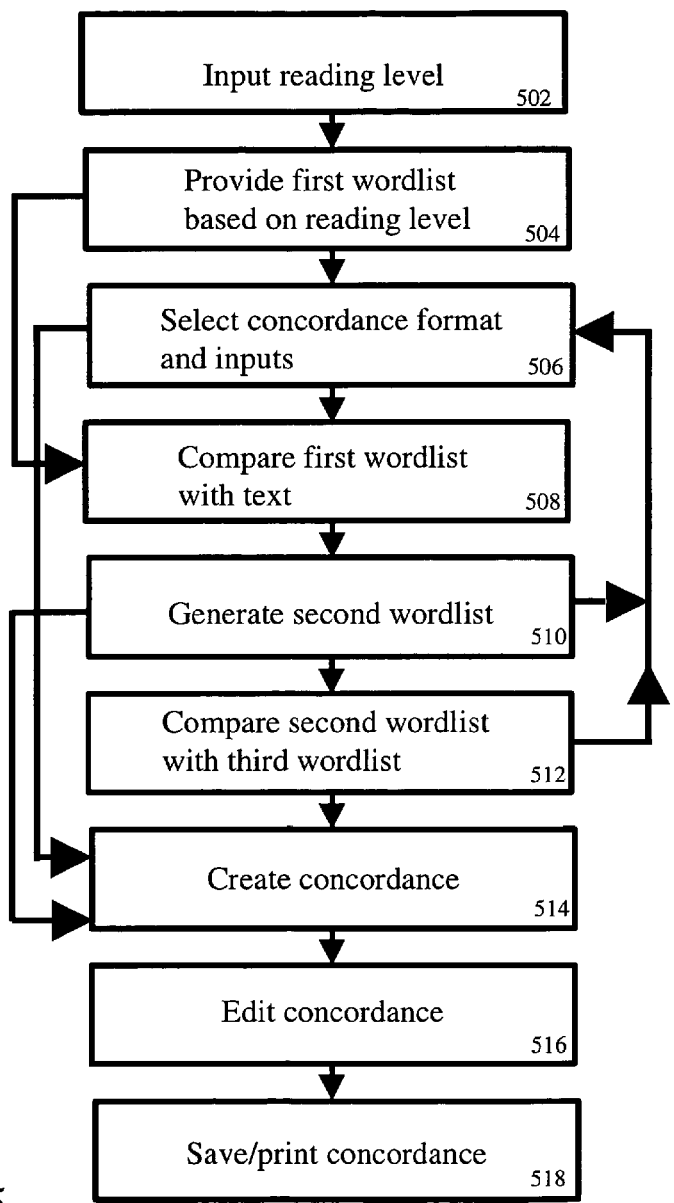
FIG. 5 is a flow chart illustrating the creation of a concordance in accordance with the invention.

FIG. 5 provides a flow diagram overview of the concordance creation process, which is described in more detail in connection with FIGS. 7 and 8 below. As shown in the preferred embodiment depicted in FIG. 5, the concordance creation process comprises the steps of inputting the user's reading level (502), generating a first wordlist corresponding to the user's reading level (504), and comparing the first wordlist with the text being read (508) to generate a second wordlist consisting of words appearing in the text that are beyond the user's vocabulary level (510). This second wordlist may then be combined to or compared with a third wordlist (512), thereby generating a fourth wordlist (not depicted). At any point in this sequence, the user may select concordance format and input parameters (506), thereby selecting the appearance of the concordance, as well as the inputs from which the concordance will draw information relating to the text units in the wordlist for which the concordance is created. After concordance parameters have been selected and a concordance wordlist has been generated, create concordance step (514) signals the computer system to display a concordance based on the concordance wordlist, in the specified format, and with the specified inputs. The user then has an opportunity to edit the concordance (516), and may choose to save or print the concordance (518). As explained in more detail with reference to FIGS. 7-8 below, the process results in the creation of a supplemental reference work that is tailored to the text being read as well as the user's requirements, as specified by the user's reading level and format and input choices.

The create concordance dialog box 700 depicted in FIG. 7 prompts the user to select a wordlist corresponding to the user's schema (i.e. the knowledge that the user brings to the text), either as determined by the computer in an interview, as described above, or as approximated by the reader on a scale of 1 to 10). Thus, to the right of "User's Schema" 702 the user can choose between "Preset" and "User Defined". Clicking on box 704 next to "Preset" causes a checkmark to appear in box 704, and permits the user to select a user's schema from a set of preset options—such as reading levels 1-10—presented when arrow 706 to the right of box 708 is clicked. Clicking box 710 next to "user-defined" causes a different set of choices to appear when the arrow to the right of box 708 is clicked. These user-defined choices may correspond to users' schemata previously created by the user or users. As the user uses the invention to read more and more literature, and continues to update the schema, the wordlist for the user's schema will become an increasingly accurate portrait of the user's actual schema.

Clicking on input box 712 corresponding to "Add additional wordlist" allows the reader to add a wordlist of his own choice or creation, or the author's index, to the concordance, regardless of whether words contained on this wordlist are part of the user's schema. Thus, important terms known to the user may, if desired by the user, appear in the concordance.

Input box 716 corresponding to "Repetitions required in text" requires the user to enter a positive integer to specify how many repetitions of a text unit in the text are necessary for it to become part of the concordance.

Clicking on the arrow 720 to input box 719 corresponding to "Display order" accesses a pull-down menu encompassing the options of "Alphabetical", "Frequency", and "Text order", from which the user can select.

Input box 722 and its associated arrow 723 corresponding to "use in text" permit the user to select whether and how the use of the concordance terms in the text will be displayed on the concordance. Thus, clicking arrow 723 provides options such as "one sentence +/−", indicating that the sentence containing the concordance term, plus the sentence immediately preceding and the sentence immediately following, will be displayed.

Clicking on "Create concordance" 726 leads to the display of a concordance result dialog box such as that illustrated by FIG. 8, and clicking on "Cancel" 728 cancels all changes made and returns to the previous screen.

In a concordance result dialog box such as that depicted in FIG. 8, in a preferred embodiment, input box 818 corresponding to "specify reference lookup" permit the user to specify secondary references in which concordance terms are to be looked up. Thus, clicking on "Specify reference lookup" box 818 permits the user to specify a particular reference work to provide input to the concordance. In a preferred embodiment, a separate reference dialog box, such as that depicted in FIG. 9, is provided for this purpose. Thus, in FIG. 9, the input is already set to the name of the concordance. Specifying a reference lookup causes information, such as definitions, from the reference work to be displayed along with the words and their frequency in the sections of text being examined to create the concordance.

FIG. 9 illustrates a reference lookup dialog box. In each case, clicking on the input box next to a parameter accesses a pulldown menu of options, from which one or more additional parameters may be selected (including, where relevant, the option of typing in a value). In cases where the additional parameters may have several different values, an additional shaded area is provided to the right, which enables the user to assign values for those parameters from a separate pulldown menu corresponding to each chosen parameter. In the case illustrated by FIG. 9, the example dialog box specifies that words in the text which are also present in the predefined wordlist named "listname" 914 are to be looked up in "Webster's dictionary" 911. All 917 punctuation 916 associated with the word in the text is to be ignored. The lookup mode parameter 924 specifies that keywords in "Webster's dictionary" are found left justified, bolded, and in the first position in one of two columns on each page. Thus, clicking on any item in the shaded area immediately to the right of the term "Lookup mode" provides access to a pulldown menu, from which one or more parameters may be selected, causing its (or their) inclusion in the list displayed on the left (in this case, "Indentation", "Style", "Position on line" and "Columns" 923 were selected from a pulldown menu containing these and other options). The value assigned to each of those parameters is displayed directly to its right, and may be changed by access to a second pulldown menu by clicking directly on each value (in this case, "Left justified", "Bold", "First word", or "2"). In attempting to look up words in "listname", the computer is to ignore punctuation in the text 926, and hyphens in "Webster's dictionary" 927. The computer is instructed to return the first line of the definition, and a link by which additional material from the definition may be obtained by double-clicking on the line 929. In this case the reference lookup was specified using menu options, by clicking on the button labeled "Menu" 921, it is also possible to specify reference lookup using a grammar or by loading preset lookup information (provided by the manufacturer) for commonly used reference works (or alternatively, for reference works specifically designed or modified to work with the invention). Thus, a reference work could be based on a standard dictionary or a single volume or multi-volume encyclopedia, or a listing of prominent persons, or a dictionary of scientific terms or a dictionary of legal terms. In a preferred embodiment, the computer program of this invention permits the user to substantially instantaneously change the source of the definition to get a perspective from something other than a standard dictionary.

Returning to FIG. 8, next to the definition for each text unit appears a box labeled "More" 820. Selecting "More" 820 for a specific entry signals the computer to display a screen that contains additional information concerning the text unit. Such additional information can include how the text unit is used in the text, an expanded dictionary entry, a picture, glossary entry, treatise entry, an encyclopedia entry, or relevant material drawn from other secondary sources either contained in or linked to the computer program.

By clicking on Edit 816, the user is provided the opportunity to edit the concordance. For each entry, the user can delete some or most of the information provided, or the entire entry, to create the concordance that will best suit the individual's particular needs. As part of the editing process, the user may select material from the concordance related to a particular text unit to be displayed on the computer screen when that text unit is encountered during reading. By clicking on the box 802 to the left of a text unit in the concordance, the reader selects that concordance entry for display during reading. In a preferred embodiment, the reader can select a specified portion of a concordance entry for display when the text unit is encountered in the text.

After satisfactory creation of a concordance, the user may choose to print the concordance for reference during his reading of the text. The concordance may also be useful in reviewing material, as in preparing for an examination, or in reading other texts containing related subject matter. In a preferred embodiment, in addition to the option to specifically edit each concordance entry, the reader has the option of viewing or printing the following concordances: text units only; text units plus definitions; text units plus definitions plus pictures (obtained by looking the text units up both in a standard dictionary and a pictorial dictionary); full concordance, or tailored concordance (i.e. the one created by the user).

Clicking on "Select" 806 permits the user to access a pull down menu which contains other options, including "Select all", "frequency", and "invert". Clicking in any of the square boxes 802 causes a checkmark to appear (or in the case where a checkmark already exists, to disappear) in the box, and leads to selection of the word next to the box for inclusion in the concordance. Selecting "frequency" causes words present in the text above a defined frequency to be selected (and checked), while selecting "invert" causes selected words to become unselected, and unselected words to become selected. Clicking on "Cancel" 810 cancels all selections made and returns to the previous display screen. Clicking on "Save" 808 causes the new concordance to be saved for later use. Clicking on "Print" 814 causes the concordance to be printed by an attached printer. Clicking on "Next page" 812 causes additional words which do not fit in a single dialog box to be displayed in a new schema result dialog box. Some schema result dialog boxes also have a "Previous page" parameter, permitting access to previously viewed material.

Clicking on input box 804 to the right of the words "Name New Concordance" permits the user to name the newly created concordance. In a preferred embodiment, a default name is suggested based on the name of the text being read. The concordance words with which he is already familiar, ensuring that a comprehensive yet focused reference can be readily developed. The user thus may make judgments regarding additional material to be displayed along with a text, before even attempting to read the text. Additionally, the user may construct multiple concordances for a given text, permitting rapid switching back and forth between such concordances when the user desires to change modes of reading.

Links Menu

Returning to FIG. 4, in a preferred embodiment, by selecting "Links" 417 from the "Text toolbar" 403, the user may select different types of links to be used when reading an electronic text. In the preferred embodiment depicted in FIG. 4E, which depicts a links menu and associated submenus, specific options include "Reference" 470, "Annotations" 472, "Same text" 474, "External" 476, and "Location" 478.

"Reference" 470 pertains to look-up of material in documents or reference works such as dictionaries (including pictorial dictionaries), glossaries, encyclopedias, and treatises. "Annotations" 472 pertains to annotations of the text. "Same text" 474 pertains to providing material associated with the document, such as footnotes, endnotes, figures, tables, and links to other locations in the text which may have been predefined by the author. "External" 476 pertains to inclusion of material from a computer network, e.g., world-wide web sites, e-mail addresses, or from a different computer program.

Links that may be displayed include but are not limited to writer-defined, user-defined, or program-defined links to other locations in documents or programs either resident locally or accessible via a computer network. Links may provide access to other computer-readable or controllable information including text, audio, still pictures, video or motion picture information.

"Reference" 470 provides the user with access to material that has been looked up in one or more reference works. The "Reference" submenu comprises the following parameters: "Select Reference works" 4701, "Input" 4702, "Lookup mode" 4703, and "Display" 4704. These parameters may also be changed from the reference lookup dialog box displayed in FIG. 9.

"Select Reference works" 4701 permits the user to provide the program the names and locations of files containing reference works to be accessed by the program. Such files may include dictionaries, thesauruses, encyclopedias, casebooks, treatises, or any other text. Such files may either be resident on the user's computer, or may be accessible through computer networks or the internet. In the special case of references associated with a concordance created by the user using the "Preread" (create concordance) option, this information may already have been provided, and is already preset to the appropriate wordlist.

Selecting "Input" 4702 permits the user to designate which material in the text block will be looked up in the designated references. Choices include "Wordlist" (permitting the user to designate one or more wordlists, which will trigger looking up words in the reference work(s) whenever a word in the wordlist(s) are encountered in the text), "Part of speech" (which causes words of a selected part of speech, e.g., nouns, verbs to be looked up in the reference work(s)), "Type" (which provides access to a dialog box permitting the user to type a word or phrase to be looked up in the reference work) and "Select" (which causes words selected by the user while reading the text, using a point-and-click device to be looked up). For example, the word "elector" 4052 as displayed in FIG. 4 was looked up in a dictionary using this feature. "Input" 4702 further provides the option of specifying additional information about how to identify words from the text for lookup, and of defining which occurrences should trigger a lookup.

"Lookup Mode" 4703 permits the user to designate how material to be looked up in the reference is to be identified in the reference. For example, in dictionaries, the primary definition of a word is normally indicated by the presence of the word as the first word on a line, and the indentation, line spacing (directly prior to the word), font, size or style of the word may be different from other words on the page. In a preferred embodiment, the computer program of this invention contains predefined lookup modes, including but not limited to styles which identify primary words in dictionaries, encyclopedias, thesauruses and casebooks. In addition, the user has the option of defining a lookup mode, either through a series of menus (as illustrated by FIG. 9) or as a grammar defining a context in which a word or words must be found in order to trigger a match and display of the appropriate material as a "Reference" link.

"Display" 4704 permits the user to designate which material from the reference will be displayed. This may simply be several lines of text surrounding the looked up material, or may be defined as an entire definition or article. If the program is instructed to return a link to the appropriate section of the reference work (as in the example illustrated by FIG. 9), the user may access more detail from the original page of the reference work by clicking on the displayed material from the reference work.

The means by which the preferred embodiment of this invention described in connection with FIG. 9 handles references permits the user access to a broad variety of references, rather than merely references specifically designed to work with the program. For example, display of reference links in this fashion permits the user to access pictorial dictionaries, which include pictures (e.g., representations, illustrations of sign language, animated sequences of a person mouthing the word) that correspond to the text units of text that he is reading. In another preferred embodiment, predefined lookup modes are not necessary, as the electronic versions of the references used are specifically designed to be compatible with the program of this invention.

The "Preread" 409 feature may be used in concert with the Reference 470 features to select text units for inclusion of such pictures based on the reader's vocabulary level or the number of times the text unit appears in the text. The ability to include such pictures based on their part of speech is of particular value to readers who wish to concentrate on learning only certain types of words. Among other benefits, such pictures serve as an aid to memory—either directly or subliminally—and may be valuable for individuals learning a foreign language or with reading disabilities. The use of pictorial links in this manner (and/or the use of verbal highlighting described below), improves the reader's comprehension and retention, without slowing down the reader's reading speed.

Figure 13:
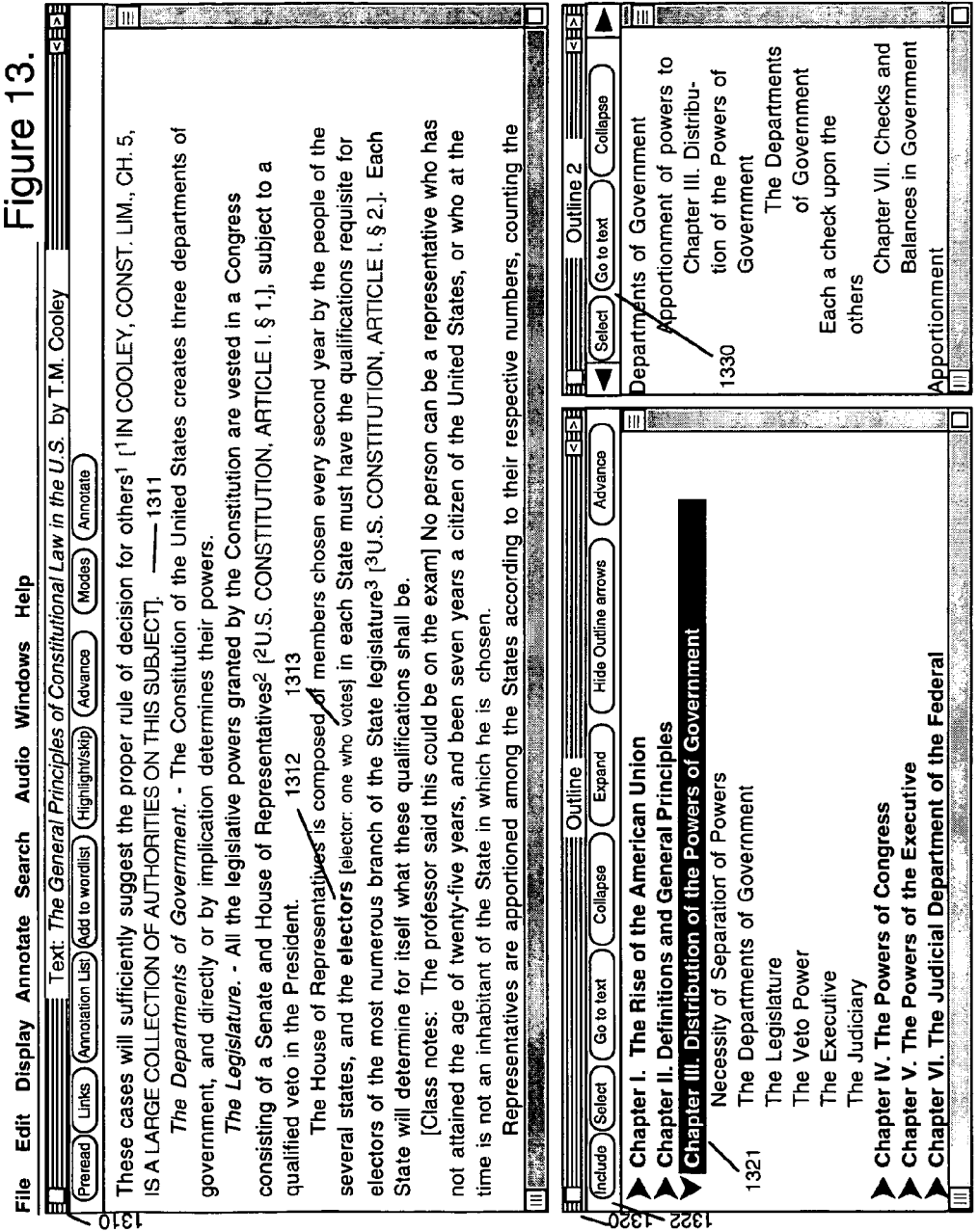

Selecting "Annotations" 472 in the "Links" portion of the "Text toolbar" permits the user to define which of the available annotations are to be displayed with the text. For example, the annotation of category "Class Notes" 4054 is shown displayed either in the margin of FIG. 4, but it can also be embedded in the text, as shown in FIG. 13. The user also utilizes the "Annotations" function 472 to gain access to the "editing mode" 4721 for display of annotations, permitting the user to define the precise mode of display of certain types of annotations. The "Annotations" function 472 permits the user to specify that text is to be displayed in the "editing mode" 4721, and to define characteristics of the "editing mode" 4721.

In the case of annotations that contain proofreaders' marks (see the description below of "Annotations" 410), or represent multiple readers' interpretations of a document, the program displays text which incorporates these comments in a way that a master editor can decide which among multiple options is the best way to state material within the text. In the "editing mode" 4721, text containing editing marks may be displayed either with the editing marks intact (for example, in the margin of the text), or alternatively, the text may be changed to incorporate the suggested revision. A third alternative is to display the text, in short segments, showing each of multiple suggested versions based on multiple different annotations. In a preferred embodiment, the master editor can choose to view the text line-by-line, with the original version on top, and other potential versions displayed beneath it. These displays are designed in such a way that text that is the same among each version is lined up vertically. In addition, the user has the alternative of displaying the original text, and showing another character (e.g., a period, ".") in subsequent lines to signify no changes from the original in that character's position.

Selecting "Same text" 474 from the "Links" menu depicted in FIG. 4E permits the user to define which of the available elements defined along with the text (e.g., footnotes, endnotes, figures, tables, links to other locations in the text which may have been predefined by the author) are to be displayed with the text.

Selecting "External" 476 in the "Links" menu permits the user to define which of the available external links (e.g., world-wide web sites, e-mail addresses, information derived from other programs) are to be displayed with the text.

For each type of link (reference, annotation, same text, or external) to be displayed, the user also defines through use of a dialog box, called up from "Location" 478 under the Links menu, whether links are displayed in the text body or in the margins of the text. For items displayed in the margin, the user may also specify whether a line is to be included between the text and the associated material in the margin. For each link, the user also may specify whether a reference (e.g., page number and line) is included to the location in the text to which the link refers. Each link (including different links of the same type) may be displayed in a different color, font, or style. Because the user also has the option of excluding the text from display in a text block, the user may thus create blocks which contain only information related to links associated with the text, and print out materials from such blocks.

"Annotation List"

The "Annotation list" option 419 in text toolbar 403 depicted in FIG. 4 should not be confused with the "Annotations" option 472 under the "Links" menu depicted in FIG. 4E. The "Annotation list" 419 in text toolbar 403 simply provides access to defined annotations, permitting rapid identification of such marked regions within the text. Under this parameter grouping, these marked areas are provided in a pull-down menu. Where the annotations have names, the names are provided, otherwise the first word or words in the annotation or, in the case where the annotation contains no words, the first words from the text directly following the annotations location are listed. Upon selection of one of these items, the region of the text with which it is associated is displayed, along with the selected annotation. The annotation list may be customized to include annotations from any combination of the categories of annotations which may be defined on the text.

Add to Wordlist Feature

Selecting "Add to wordlist" 411 in the "Text" toolbar 403 depicted in FIG. 4 permits the user to add words in selected text to a specified wordlist for use in any of the purposes which wordlists have in this invention.

Highlight/Skip Feature

In a preferred embodiment, selecting "Highlight/skip" 421 in the "Text" toolbar 403 of FIG. 4 calls up a menu, such as that depicted in FIG. 4F comprising various additional features such as "encoding" 480, "skip/include" 482, "cursor" 484, and "attributes" 486.

"Encoding" 480 permits the user to define which elements within the text block will be encoded using specified attributes. Elements which may be selected for highlighting in this fashion include specific elements of speech (such as nouns, verbs, adjectives, or adverbs), material associated with certain links as defined above (including simply a designation of the existence of a link, or the presence or absence of a word in a specified wordlist), or the location on the page. For example, the text block 1410 in FIG. 14 illustrates the highlighting of words e.g., 1411, present in the wordlist shown in FIG. 3. For each such definition of encoding, the user also describes the specific attributes for display of each type of encoded text, including their color, size, brightness, spacing, bolding, italicizing, capitalization, font, style (including underlining), or by providing voice pronunciation.

"Skip/Include" 482 permits the user to designate any of the items listed above under "Encoding" 480 to be left out of the displayed text. Alternatively, the text may be displayed in a way which includes only the selected elements. For example, specific parts of speech may be left out of the textual display. This feature is useful for prereading or skimming, where it is presumed that the benefit of including parts of speech such as adverbs or adjectives is outweighed by the additional time it takes to read them. Clicking on parts of speech 4822 under the skip text skip submenu 4821 signals the computer to display a menu listing all of the parts of speech. Each part of speech can then be selected for inclusion 4823 or exclusion 4821. In addition, the user may specify that all the text be omitted (permitting exclusive display of links in a block). This permits the use of a text block for the exclusive display of references, or for the exclusive display of figures and/or tables associated with a text. The user may also easily switch out of the skip text mode, permitting display of the text in its full context.

Figure 15:
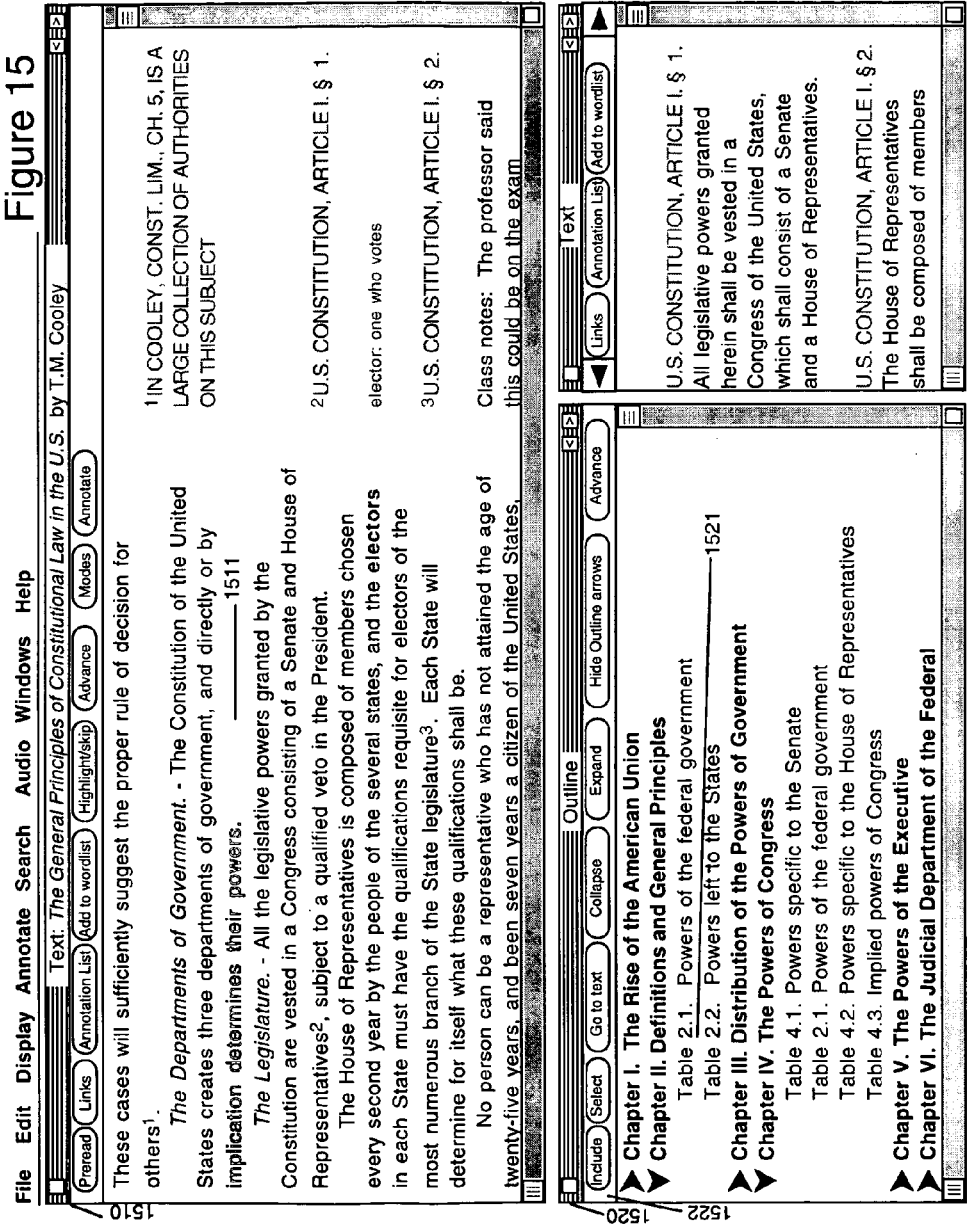

The "cursor" parameter 484 permits the user to select a cursor for aid in scanning the text block or scrolled text. The cursor can comprise a flashing line, a bright spot, a dark spot, an image of a finger, highlighting (by alteration of text attributes), voice pronunciation of some or all of the text, other audio signals (such as metronomes), or any other means that might be used to assist in reading a text block or scrolled text at a predefined speed. The user selects the speed and pattern of cursor movement across the text. The text block in FIG. 15 illustrates a "cursor" 1511 which highlights an entire line of the text at once, and moves down the screen at a predefined rate of speed. Alternatively, "cursor" movement may be defined by deletion of text from the display at the predefined rate of speed. This speed may be synchronized with the display of text using the "Advance" 423 feature in the text toolbar.

Advance Feature

In the preferred embodiment depicted in FIG. 4 and FIG. 4G, selecting "Advance" 423 from text block toolbar 403, calls up a menu featuring "Select Display Type" 488, "Select Speed" 490, and "Sequencing" 492.

"Select Display Type" 488 gives the user the option of designating whether automatically displayed text will be provided as discrete blocks or scrolled (from the top or bottom) in a predefined location on the page.

In a preferred embodiment, by selecting "Select Speed" 490 a user may define the rate at which text is displayed (for scrolled text, this may be defined in lines per unit time; for text in block form, this may be defined in terms of intervals between display of successive blocks of text; or, in either case, in terms of words or characters per unit time). In addition, in a preferred embodiment, the user is able to select keys which may be used to increase, decrease, or stop the rate of display of text while observing the text without further reference to the dialog box. The user also is able to select a key to advance the display manually. Furthermore, the user is preferably able to select variable rates of speed which change in a manner predefined by the user.

Figure 12B:
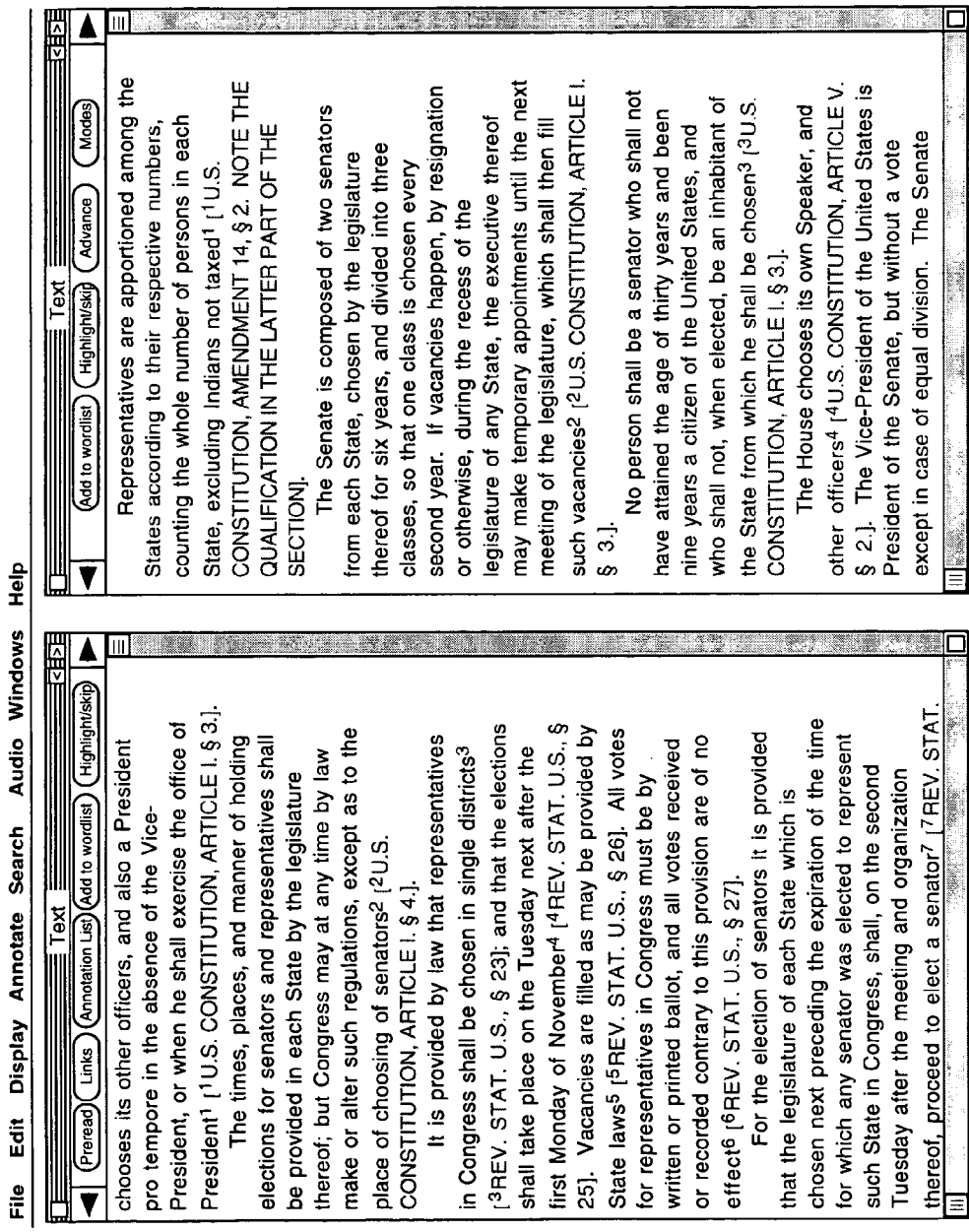
FIGS. 12 to 15 illustrate display screens showing text being displayed in various configurations by the program. In these examples, the text is derived from "The General Principles of Constitutional Law in the United States of America", by T. M. Cooley, 3rd edition, Little Brown and Co., Boston, 1898.

In a preferred embodiment, the user may select "Sequencing" 492 to select the order in which text appears in different text blocks present on the screen but assigned to the same text. The user progressively selects blocks for appearance of text, until a block which has already been selected is picked again. This defines the sequence of text display. If no block is reselected, text display continues in the last block chosen. For example, the user can specify that text will initially appear in a text block located in the upper left hand corner. After the first screen interval, the first group of text remains in the upper left hand corner, and a subsequent group of text is displayed in a text block located in the lower right hand corner. After the second interval, the text in the first text block is replaced by a third group of text, and so on. Alternatively, the user may specify that text appears in all blocks at the same time, and is replaced in older blocks within the sequence over time. This may better simulate the reading of a book, where, for example, there may be two pages displayed in two neighboring blocks (as shown in FIG. 12a), and after a predefined interval permitting the reader to reach the second page, the contents of the third page replace those of the first page (which is simulated by the first text block, shown in FIG. 12b). While certain readers may prefer to have relatively long blocks of text in each text block, some readers may find it advantageous to have only a very few text units in each text block. By having relatively small amounts of text appear in different locations on the screen in rapid succession, rapid eye movement and increased mental alertness is promoted. In a preferred embodiment that is especially useful when the amount of text present in a text block is relatively small, the reader has the option of specifying that symbols replace such space-consuming conventions of punctuation as indentations and hard returns as may appear at the end of a paragraph.

Thus, for example, rather than a hard return and one or two indentations, a new paragraph would be indicated as ¶ symbol.

In a preferred embodiment, when a definition or certain other links appear, the user has the option of specifying that screen advancement automatically switches to manual mode. In this embodiment, the user also has the option of overriding the screen interval (or scroll speed) deactivation feature such that the screen continues to be updated automatically. In another preferred embodiment, the user has the option of selecting a mode wherein the screen interval automatically increases when a definition is displayed on the screen, by a percentage proportional to the volume increase in text (as measured by characters, words, or sentences) due to the definition.

In addition to the parameters described above, the dialog box called up by clicking on "Select Speed" 490 provides a "variable" option 4904. This option permits the user to vary the size of the text block that the user will see over time. This feature can be used to gradually increase reading speed.

In a preferred embodiment, "Variable" 4904 comprises the alternatives "variable-faster" 4907, "variable-slower" 4908, or "variable-difficulty" 4909. Selecting "variable-faster" 4907 causes the time interval between screens to decrease (or the speed of scrolling to increase) at a rate chosen by the user, and can be useful to users wishing to increase their reading speed. Selecting "variable-slower" 4908 causes the time interval between screens to increase (or the scroll speed to decrease) at a predetermined rate, and can be useful to users wishing to compensate for fatigue as they read. Selecting "variable-difficulty" 4909 causes the interval between screens (or the scroll speed) to increase or decrease in accordance with an algorithm that takes into account the length or difficulty of words, length or structure of sentences. In a preferred embodiment, the algorithm for determining the difficulty of a passage utilizes an electronic dictionary and/or glossary which has assigned difficulty levels to each word. The rate at which text is displayed decreases as the number of words in a given textblock (or in a given number of words of text) that exceed a reading level input by the reader increases.

Copending application Ser. No. 08/818,152, filed Mar. 14, 1997, for a User Interface for Dynamic Presentation of Text, the specification for which is incorporated herein by reference, describes a novel method of text advance based on the user's eye or head movements that is used in a preferred embodiment of the present invention.

In a preferred embodiment, the user can also select "manual" 4901 under the "Select Speed" submenu 490, thereby deactivating the automatic screen update of the screen interval function or the automatic scrolling function. In the "manual" mode for screen advance, successive screens are displayed in response to mouseclicks or specified keys, or similar signalling mechanisms. Similarly, for the "scroll" mode of screen advance, the "manual" mode permits the user to manually control continued scrolling by using appropriate mouseclicks or depressing a key.

The "Select Speed" parameter also permits the user to select the manner in which text is presented. Clicking on "text presentation" 4902 calls up a submenu showing "letter-by-letter", "word-by-word", or "cluster-by-cluster". Choosing "letter by letter" means that the text block will be displayed letter by letter. Selecting "word-by-word" signals the computer system to display the text block word by word. Selecting "cluster-by-cluster" calls up a further menu that permits the user to define a cluster in terms of number of sentences or words, and signals the computer to display the text in clusters as defined by the user.

The "Modes" 425 function on the "Text" toolbar provides the user access to special modes, as illustrated in FIG. 4H. Additional modes (associated with saved parameter sets) may be added to this list by the user. One pre-defined special mode accessible to the user by this method is the "Auto-annotate" mode 4251. When text is displayed in this mode, typing while observing text automatically causes an annotation to be created at the location of the cursor, as described below either under the "Text" 4276 or the "Audio" 4277 function under the "Add" 4274 submenu in the "Annotate" function in the text toolbar, depending on the specification of the user. Use of this mode as a shortcut to the "Text" function 4276 excludes definition of shortcut keys as any of the normally used letters and text symbols. Conflicts, if any, are reported to the user when entering this mode, so appropriate changes in shortcut keys may be made.

By using the voice "Auto-annotate mode" 4251, for a computer equipped with an audio input recording device, the user may make voice recordings of annotations as text is either read by the user or read to the user by the computer. Voice recordings can be stored as voice recordings, or can be converted to text by voice recognition programming as is known in the art.

In a preferred embodiment, text blocks marked as having annotations are saved for later retrieval on reread or can be printed out and used as notes. The "Annotate" function 427 contains the following subgroups: "Change category" 4271, "Add" 4274, and "Remove" 4279.

In a preferred embodiment, the user has the option of "marking" text for more than one category. For example, one category might represent something the user wants saved because it is important, whereas another category might represent something the user wants saved because he does not understand it. For text marked in the second (don't understand) category, during rereading, the reader could review and study the marked text and then decide whether to mark it for inclusion with the "important" material. For example, the illustration of FIG. 10, the annotation is designated as belonging to the category of "Class notes" 1010, which may be one of several categories defined for this text. Different categories of annotations are accessed using the "Change category" function 4271. This function displays the currently selected category (a file containing annotations of this category), and permits access to the "List categories" 4272 function (which displays all defined categories for the document) and "New category" 4273 function (which permits creation of new categories of annotations). In a preferred embodiment, specific keystrokes corresponding to creation of an annotation in each category may be defined by the user.

The "Add" function 4274 is the primary method by which annotations are added to the selected category. New annotations are defined on a region of text by selecting a region in a text or outline block and choosing an operation from the "Add" 4274 parameter grouping. These operations include: "Mark" 4275, "Text" 4276, "Audio" 4277, and "Link" 4278. Any annotation may include one or more items defined by these operations.

"Mark" 4275 simply marks the text, permitting subsequent ready access to it. When marking text, a name may be given to the location, for display on the outline or a pulldown menu of annotations (the "Annotation list" 419 parameter) in the "Text" toolbar 403.

"Text" 4276 marks the text, but also permits inclusion of text annotations for comments on the text. A sample "Text" dialog box 1040 is illustrated in FIG. 10. This may be useful when the user wishes to retain his or her initial thoughts on reading the text, or when a user wishes to provide his or her thoughts regarding this text to another user. If a text location is included, the annotation is stored at that location. If a region of the text is selected, for example, with a point and click device, the entire selected text is copied into the annotation, and can be further edited there if desired. The "Text" 4276 function also permits the user access to a full range of copy-editing symbols 1020 (including those for text deletion), which are recognized for display in the "editing" mode 4271 described above in the description of the "Text" toolbar 403. The "Auto-Annotate mode"4251 described under the description of "Modes" 425 accessible through the "Text" toolbar 403 provides direct access to the text function as soon as the user starts typing. This provides a handy shortcut for a user who wishes to take notes while reading a text using an automatic page advance mode. In a preferred embodiment, specific sentences or lines within the text on the viewed page may be copied directly into a text annotation by reference to the sentence or line number displayed (when sentence or line numbers are displayed), by depressing the ALT key while typing the number.

Through use of a microphone attached to the computer, the annotator (user) may also include his or her voice annotations in the document, through use of the "Audio" 4277 function. In addition to voice, the "audio" 4277 function also permits access to other sounds predefined by the operating system of the computer. The "Audio" parameter may also be selected as a part of the "Auto-annotate" mode 4251. This permits annotations to be automatically created and stored if the user speaks or makes sounds while reading the text (or having the text "read" to him or her by the computer). Such annotations may be coupled with other commercially available programs to decode speech, permitting translation of such voice annotations into text annotations. Alternatively, when desired, this function could be served by an editor. This feature is expected to permit the user to make efficient use of time otherwise not readily available, for example, while driving an automobile, a text could be "read" to the user over the car's stereo system, and the user could make spoken annotations without diverting his attention from driving the car. This feature could also be used in conjunction with an "automobile keypad" 1101, as described in the following paragraph.

As depicted in FIG. 11, the "automobile keypad" 1101 is a device which is attached to an automobile (preferably the steering wheel) and to a computer (preferably a laptop) which provides the user (the driver of the automobile) access to a limited subset of functions associated with a program being run on the computer. The automobile keypad contains keys which have hardware configurations identical to those in normal computer keyboards, and a microphone, which may be plugged into the auxiliary keyboard port (and audio input port) of a laptop computer. Different versions of the automobile keypad have different numbers of keys, but in all cases, the number of keys is lower than on a normal computer keyboard. Provided with the automobile keypad is a computer program which permits the writing of macros for the keys of the automobile keypad, which define keys or combinations of keys on the automobile keypad to denote meanings identical to those associated with specified keys or combinations of keys, mouse movements or mouse-clicks, or other methods of designating instructions to a personal computer. Thus, in the context of the invention described herein, a five-key automobile keypad could be programmed such that one key instructs the program to read the text from the current cursor position, another key instructs the program to back up quickly (e.g., rewind), another to jump forward in the text, another to stop reading, and another to stop reading and store a voice annotation of the text. The same instruction set (or any instruction set containing up to seven elements) could also be encoded using a three-key automobile keypad, in such a way that depressing one, two or three keys simultaneously would instruct the computer to perform specified operations. While the automobile keypad is of substantial utility in this described embodiment of this invention, it is clear that an automobile keypad could be configured to operate with many different kinds of computer programs, permitting the user to recapture time spent driving a car (e.g., commuting to work) for more productive purposes.

Selecting "Link" 4278 permits the user to create links to other locations within the document, other texts, networks, or other computer programs within the annotations.

Selecting "Remove" 4279 permits the user to remove annotations from a specified region on a text.

It is noted that user-defined annotations may be displayed as "links", either in the text or on the outline.

The Information Toolbar

FIG. 4 provides a display of all three types of blocks—text block 403, outline block 413, and information block 415. "Information" toolbar 431 in the information block 415 permits the user to select from "Reading speed" 4311 and "Location" 4312, as further depicted on FIG. 4I. These parameters signal the computer to display in a block information related to the user's reading speed, or typewritten or graphical information related to the user's location within the document (for example, a graphical representation of the page, chapter, or document the user is reading, with information on the location on that page, chapter, or document).

The Outline Toolbar (FIG. 4J)

In FIG. 4, "Outline" block 413 permits the user to view a table of contents or outline for the text, which may be constructed by the computer program or provided separately by the author or an editor of the associated text. "Outline" blocks are created using the "New Block" 454 function.

When generated by the invention, an outline is based on headings, changes in font, typeset, and other cues often used by authors to denote document structure. In a preferred embodiment, the computer outline generator uses a predefined grammar to identify different headings within the text and their defining characteristics, and uses the order in which they appear relative to one another to determine their precedence. The invention also utilizes specific information (including specific words and page numbers) contained in the table of contents or other information regarding document structure provided with the text (e.g., tables of references, lists of figures or tables, indexes) to the extent they are supplied with the text to generate a new grammar, which is used to parse the text, in turn generating the outline. Items recognized in the course of preparing the outline (whether or not supplied explicitly by the author of the text) include locations of various components of the text (e.g., headings, figures, tables, indexes) and references from within the text (e.g., to figures, tables, indexes, material outside of the text, or other parts of the text). If annotations are included for the text, they are also incorporated into the outline.

Turning to the menu and submenus depicted in FIG. 4J, when viewing the outline, the reader is given the option through the "Include" function 4291 in the "outline toolbar" 429 of viewing various elements associated with the text. These include the titles of one or more texts associated with the outline, a listing of all index entries (from the author's index, as for example, is illustrated in the "outline block" 413 shown in FIG. 4) and references to all figures and tables that appear under each heading (an outline block which displays tables, e.g., 1521 referred to by the text is illustrated by FIG. 15), or under selected headings (an outline block which displays subheadings under one of the major headings is illustrated by FIG. 13). In addition, when viewing the outline, the reader also has the option of viewing the first and last sentences, the first and last paragraphs, or other information from the text, under each heading, under selected headings, or in association with other items in the outline. This information helps the user to understand the context of elements both in the outline and in the associated text. For items included in the outline, the user has the option of specifying whether headings at higher levels of the outline (which may help to put those items in context) are also to be automatically displayed (e.g., uncollapsed, as defined below) on the outline. Selecting "size" 4292 causes the number of words, pages, or lines of text in sections of the text referred to by headings in the outline to be displayed on the outline, preferably on the same line as the heading itself. The outline may also include references to links within the text. The user may specify that the results of searches and reverse indexing are displayed on the outline 413. A sample search result 1450 is displayed on the outline block illustrated by FIG. 14. Reverse indexing is described under the "Search" function below, and is illustrated in the second outline block 1330 in FIG. 13.

The "Select" parameter 4293 permits the user to specify whether material selected by use of the point and click (cursor-control) device on the outline refers to the outline itself, or to the corresponding material in the associated text. Multiple specific elements, not necessarily contiguous, may be selected from the outline by holding down the "Shift" key while selecting items on the outline. After being selected by a point and click device, a region on the outline is highlighted 1321 (as in FIG. 13). If the "Select" parameter were set to "outline", then this selection would merely refer to the selected line on the outline. However, if the "Select" parameter were set to "text", then this selection would refer to all of Chapter III in the associated text. A search for a specific word could then be limited to Chapter III, or alternatively, Chapter III could be selectively printed out without selecting the material directly on the text block. After selection of this line on the outline, selecting "Go to text" 4294 on the outline toolbar 1322 would cause the text display to begin at the start of Chapter III.

In addition, the "Select" parameter 4293 permits the user to specify the selection of items on the outline based on their level relative to already selected items. For example, specifying to "Select" the "all in selected level" in the example 1320 in FIG. 13 would cause all chapter headings to be selected on the outline. Other options include "all above selected level", "all below selected level", "all above selected items", "all below selected items", and "invert" (which causes all unselected items to become selected, and all selected items to become unselected).

For all elements displayed in the outline, appropriate links to their locations in the associated text block are provided so the user may use the outline to move around the document using simple mouse action. Thus, clicking on "Go to Text" 4294 calls up the text corresponding to a selected item of the outline. If multiple items on the outline are selected, clicking on "Go to text" repeatedly causes the referred-to items in the associated text block to be displayed sequentially. The outline also includes a scroll bar, which permits scrolling through the outline.

By simple mouse action, the reader may change the depth of the outline presented, and the types of information presented on it. The display of the outline is controlled by the "Collapse" 4295 and "Expand" 4296 functions. Selected items on the outline may all be expanded (meaning that items at the level beneath the selected headings are to be displayed) or collapsed (meaning no items beneath the selected headings are to be displayed) using these parameters. In addition, all elements of an outline below (or above) a selected item may be expanded or collapsed. For any level of the outline, the material below it may be hidden from view by selection of the arrow (e.g., 4131) appearing to the immediate left of the item. When this arrow is pointing to the right 4132, this section of the outline is collapsed. When the arrow is pointing down 4131, this section of the outline is expanded. Access to these arrows may be gained by clicking on "Show Outline Arrows" 4297, and the arrows may be eliminated from the display by clicking on "Hide Outline Arrows" 4297.

"Advance" 4298 in the outline toolbar permits the user to specify whether the displayed location in the outline is linked to the displayed location in an associated text. Under some circumstances, the user may desire the outline to scroll forward as the text is read. Under other circumstances, the user may prefer to keep display advance of the two unlinked.

Outlines may refer to one or more texts or reference works which are available to the user. The ability to use the outline to specify searches within these multiple texts or references, or to specify other operations on multiple texts or to display the results of operations on multiple texts provides the invention with the unique capability of indexing and accessing an entire library of material which would otherwise be very difficult for the user to keep organized.

"Annotate"

The Annotate 410 function provides easy access via a menu to the functions associated with annotation, including annotation list 419, annotate 427, and auto-annotate mode 4251 in text toolbar 403.

"Search"

An integral element of reading a text is the ability to search for specific elements within that and other texts. Selecting "Search" 412 provides access to this function. Specifically, as illustrated on FIG. 4K, clicking on "Search" 412 calls up a menu providing as choices "Find" 4121, "Find again" 4122, "Reverse Index" 4123, "Display results" 4124 and "Attributes" 4125.

Selecting "Find" 4121 provides a dialog box which permits the user to specify material which he or she desires to locate in material associated with any block, including a text block or an outline block, displayed on the screen. Finding items associated with a reference work referred to in the text is governed by the specifications regarding that reference work, using a dialog box which assigns values similar to those associated with the "Lookup mode" 4703 also partially illustrated in FIG. 9. The user also may specify whether linked documents are to be searched. The region of the document to be searched may be limited by selecting portions either of the text or the outline (as described above). In addition, the user may specify whether all occurrences of the specified sequence of characters are to be found and displayed, or only the next one going forward or backward from the current position in the selected text. The material to be found may be specified either as a sequence of characters, a list of words (including reference to a pre-defined wordlist) from which a match of one of the words triggers a match, or more complex items, such as different sequences of characters, all of which must be found within a specified distance of one another.

"Find again" 4122 permits the user to re-perform the most recently performed Find operation from the current position in the specified document, without reference to the "Find" dialog box. The user is also permitted to define keys to scroll forward and backward through elements found as the result of a "Find" operation which identified all occurrences of a specified sequence of characters in the document.

Selecting "Reverse Index" 4123 causes elements related to selected text displayed in a block, or selected portions of an outline displayed in a block, to be searched for words which are present in the document's author-defined index. If no portion of the text is specified, the search comprises a range of words around the current position in the document predefined by the user. The results of this search are displayed on the outline, or in the document. For use of reverse indexing, it is useful to set up a separate outline block which contains only the results of reverse indexing, which can be set to scroll forward automatically as the user reads through a text. From such a block, the user may directly access other related materials by simple mouse action. This feature aids the reader in finding related material which is interspersed throughout the text, while taking advantage of the fact that the author has already made a judgment regarding its relevance. The "Reverse Index" function may be left "on" while reading a text, thus, perpetually updating information in the associated outline block regarding the existence of links to other material in the text through the index as the reader progresses through the text.

Selecting "Display results" 4124 presents the user the option of specifying whether the results are to be shown on an outline block, or the cursor of the document is to go to the position where the group of characters is found, or both.

The "Attributes" 4125 parameter permits the user to specify how search results will be displayed (e.g., font, style, color, size) to differentiate them from normal elements within the searched block.

The "Audio" Parameter Grouping.

Selecting "Audio" 414 permits the user to select background music for his reading. The music can be retrieved from a list of music 4141 available to the source of the software, or may be taken from musical files from the user's own library.

Selecting "Other sounds" 4142 permits the user to select other background sounds for his reading. These sounds can include a ticking clock, a metronome, a beeping sound, or any other sound that might facilitate reading or enhance reading pleasure. These sounds may proceed at a rate independent of automatic advancement of text using the "Advance" 423 parameter in the "Text" toolbar 403. "Audio" 414 also provides the user access to audio parameters associated with the "Cursor" 484 function under the "Text" toolbar 403, the tempo of which may be changed in accordance with the rate of text presentation defined under the "Advance" 423 function in the "Text" toolbar 403.

The "Help" Parameter Grouping.

In a preferred embodiment, selecting "Help" 418 signals the computer system to execute a help program, which provides explanations of the operation of the embodiment of the invention on the computer system (100) on which it is implemented. In a preferred embodiment, the help program provides for printing, saving, editing, searching, scrolling, and book marking in a manner well known to users and programmers of Windows™ applications.

FIG. 4 is an illustration of a display screen showing display of text from a textbook in a "text block" 405, with links associated with that text being displayed in the margin of the text 4051. This block also illustrates the lookup of a word (elector 4052) in a different reference work (a dictionary) and display of the result in the margin of the text in a smaller size 4053. This lookup is predefined by a reference dialog box such as that illustrated by FIG. 9. An "outline block" 413 displays an outline of the text being read, and includes entries from the author's index 4133 (originally supplied with the paper version of the text), shown in green italics, which refer to that portion of the text. This outline block may be used to change the text displayed in the associated text block to that referred to in the outline, by use of the "Go To Text" parameter in the outline toolbar 429. In addition, selection of an index entry provides the user access to other locations in the text also listed in the author's index by the same index entry. An "information block" 415 displays information regarding reading speed to the user. This information is continuously updated as the reader progresses through the text. An annotation 4054 is displayed in the margin of the text block in a blue gothic font.

FIG. 10 illustrates an annotation input dialog box, which permits the user to specify an annotation type and to type in material comprising the annotation. Sections of the text may be included in this annotation by selecting them with a point and click device prior to accessing this dialog box. The user may include text or proofreader's marks in this written annotation. The text box may be left empty, providing a "bookmark" to the location in the text from which the annotation was created, which may be accessed using a pulldown menu list of annotations defined on the text. The program also has the capability of saving audio annotations in a similar manner. This example shows how the annotation displayed in FIGS. 10, 11 and 13 was entered into the program.

FIG. 11 illustrates an "automobile keypad", which may be used as described to access some features of this invention while driving an automobile. It consists of a keyboard containing a small number of keys (in this example 5), a means 1104 for attaching the keyboard to a steering wheel 1105 or other location accessible to the driver of a car, a means 1102 for connecting the keyboard to a laptop computer 1103, and a means for programming the keys on the automobile keypad to perform several functions associated with a program being executed by the laptop computer. This aspect is particularly useful where the computer provides audio output. Thus, it can be used to "read" a document of interest while driving; or to look up information (such as directions to a desired location).

FIG. 12*a* is an illustration of a display screen showing a text being displayed in two separate text blocks by the invention. "Links", including footnotes in the text, are displayed as red capital letters, embedded within the text in this and the other examples.

FIG. 12*b* is an illustration of a display screen showing material from the text shown in FIG. 9A being displayed in two separate text blocks by the invention, after a specified time interval passes and signals the computer to advance the display to the next page. In a preferred embodiment, material derived from a single text can be displayed sequentially in different blocks, in a sequence chosen by the reader. This feature, which enhances the reader's sense of reading actively and thereby improves mental alertness during reading, may be selected using the "Advance" function, in the text and outline toolbars, as described below.

FIG. 13 is an illustration of a display screen showing display of text from a textbook in a "text block" 1310, with links 1311 associated with that text being displayed as red capital letters within (or embedded in) the text. This block also illustrates the lookup of a word (elector 1312) in a different reference work (a dictionary) and display of the result 1313 within the text. An "outline block" 1320 displays an outline of the text being read, and illustrates the selection of an item 1321 on that outline. Selection of "Chapter III" on this outline block could refer either to the entire "Chapter III" in the associated text block, or only to the line in this outline block, depending on the value of the "Select" parameter accessed from the outline toolbar 1322. A second "outline block" 1330 (labeled Outline 2) illustrates the concept of "reverse indexing", in which other locations in the text which contain information related to the text being displayed (based on their presence in the index of the text) are made accessible to the user.

FIG. 14 is an illustration of a display screen showing display of text from a textbook in a "text block" 1410, with highlighting of words 1411 (by change of font to outlined characters) in the text which are also found in the sample wordlist illustrated in FIG. 3. An "outline block" 1420 displays an outline of the text being read, and illustrates display of the results of a search for the word "elector" 1450 on that outline. The search result is also displayed on the text block 1412. A second text block illustrates the lookup of information from the original text 1410 in a second reference work, namely, the Constitution of the United States. Specifications for this lookup are given by the user via a reference lookup dialog box, such as that illustrated by FIG. 9.

FIG. 15 is an illustration of a display screen showing display of text from a textbook in a "text block" 1510, with display of a cursor 1511 designed to pace the user in reading the text at a predefined speed. This type of cursor moves through the text at a predefined rate of speed, aiding the reader in maintaining a desired pace. An "outline block" 1520 displays an outline of the text being read, and illustrates the display of information about associated materials (in this case, tables 1521) referred to within the text. Because table 2.1 is referred to both in chapters II and IV, it appears twice in the outline. The table-name listing in the outline may be used either to access the relevant text (using the "Go to Text" parameter in the outline toolbar 1522) which refers to the table, or to cause the table itself to be displayed (by double-clicking on the table name).

The steps required to program a computer system to accept suitable signalling and image the aforementioned displays are well known to one of ordinary skill in programming for Windows™ applications.

In the described preferred embodiment, the main parameter groups as displayed in FIG. 4 include "File", "Edit", "Display", "Annotate", "Search", "Audio", "Windows", and "Help".

Document Reconfiguration and Information Extraction.

As further shown in FIG. 2, after the Designate Values for Parameters step (206), the computer system formats the electronic text in accordance with the parameters input by the user (208) and displays it in accordance with those parameters (210), or extracts the appropriate information from the document (212) and displays that information (214). After these steps, the document may again be reconfigured and new information may be extracted, or the parameter input process (202) may begin anew.

The invention thus allows the user rapidly to switch from one mode of reading to the next by allowing the user to change the assigned values as desired with simple mouse action in a dialog box or other methods associated with the parameter input process, then, again with only simple mouse action, view the resulting text.

Other Considerations.

In a further preferred embodiment, the computer system may be signalled to execute selected commands by pressing appropriate keys on a keyboard communicating with the computer system. For example, icons may be highlighted in turn by repeated pressing of the "Tab" key or the "Control" and "Tab" keys on the keyboard simultaneously, and the computer system could be signalled to execute the function represented by the highlighted icon by pressing the "Enter" or "Return" key on the keyboard. Similarly, selected menu bar entries and other command names displayed in text by the computer system may include a letter that is highlighted or underscored. In the case of a command, pressing the key on the keyboard for the underscored or highlighted letter signals the computer system to execute that command. In the case of a menu bar item, pressing signals the computer system to display a pull-down menu with a list of entries and command names corresponding to selected icons. Through the use of well-known techniques, including using keyboard arrow keys to highlight a selected entry or command and pressing the "Enter" key, a user may also signal the computer to execute a selected command or the display a selected entry.

It will be apparent to those skilled in the art that the invention described herein is not limited to the specific preferred embodiments discussed above. For example, although the above discussion describes a program using a mouse device on a Windows™ platform, those skilled in the art will recognize that the invention could also be practiced with input devices such as trackballs, joysticks, light pens, and the like, and could also be usefully implemented on platforms such as Macintosh, X-Windows, Motif, NextStep, OS/2, and the like. This invention also may be practiced on stand-alone machines constructed for this purpose. Furthermore, those skilled in the art will recognize that this invention or parts of this invention could be practiced using computer hardware, bypassing the use of software for the purpose of providing the functionality of the invention. It will also be apparent to those skilled in the art that various modifications can be made to this invention of a computer-implemented method for processing and displaying text data objects without departing from the scope or spirit of the invention, including different implementations of the "parameter input process", as defined for this invention.

It will be apparent to those skilled in the art that various modifications can be made to this invention of a text presentation device and method without departing from the scope or spirit of the invention. It is also intended that the present invention cover modifications and variations of the text presentation device and method within the scope of the appended claims and their equivalents.

I claim:

1. A method for using a computer system to provide a user interface to an electronic text, comprising in sequence the steps of:
    a. on a display controlled by the computer system, presenting a portion of an electronic text and a portion of an outline of said electronic text, wherein:
        i. an element of the text comprises at least one phrase appearing in said electronic text, said at least one phrase comprising at least one word;
        ii. said outline comprises a plurality of elements, wherein elements of the outline comprise copies of elements of said electronic text;
        iii. each element of the outline represents a portion of said electronic text;
        iv. the combined elements of the outline comprise substantially less text than the entire said electronic text;
        v. substantially all portions of said electronic text are represented by at least one element of the outline;
        vi. at least one outline element is hierarchically superior to at least two other outline elements, indicating that said hierarchically superior outline element represents text also represented by said at least two other outline elements;
        vii. the relative positional and hierarchical relationships of elements of the outline correspond to the relative positional and hierarchical relationships of the portions of said electronic text represented by said elements of the outline; and viii. said presented portion of said outline is presented on said display in a distinct screen region different from the screen region in which said portion of electronic text is presented; and b. detecting a change in display location within said electronic text, wherein:

i. said display location represents a location of said electronic text that is presented on said computer display; and ii. said change in display location is from a text location corresponding to a first outline element presented in said distinct region of step a.viii, to a text location corresponding to a second outline element initially not presented in said distinct region of step a.viii; and c. displaying said second outline element in said distinct region of step a.viii, wherein:

the relative positional and hierarchical relationships of elements of the outline displayed on said distinct region of step a.viii correspond to their positional and hierarchical relationships in said outline.

2. The method of claim 1, further comprising the step of:
d. eliminating display of said first outline element in said distinct region of step a.viii.

3. The method of claim 1, further comprising the step of:
d. dynamically maintaining display in said distinct region of step a.viii of each of the outline elements that correspond to text represented by said display location of step b.

4. The method of claim 1, further comprising the step of:
d. dynamically maintaining display in said distinct region of step a.viii of outline elements with a shared hierarchically superior outline element, wherein said shared hierarchically superior outline element corresponds to text represented by said display location of step b.

5. The method of claim 1, wherein information related to a portion of said electronic text, said portion of electronic text corresponding to an outline element, is displayed in said distinct region of step a.viii only when said outline element is displayed in said distinct region of step a.viii.

6. The method of claim 5, wherein said information is related to an annotation of said electronic text.

7. The method of claim 5, wherein said information comprises information about the speed at which electronic text corresponding to said outline element was read.

8. The method of claim 5, wherein said information comprises an indication of whether the current display location of step b corresponds to text corresponding to said outline element.

9. The method of claim 5, wherein said information comprises an indication of whether text corresponding to said outline element has already been read.

10. The method of claim 5, wherein said information comprises information about additional references that are related to the content of electronic text corresponding to said outline element.

11. The method of claim 5, wherein said information comprises the result of a search of electronic text corresponding to said outline element.

12. The method of claim 5, wherein said information comprises the length of the portion of electronic text corresponding to said outline element.

13. The method of claim 5, wherein said information comprises a portion of said electronic text corresponding to said outline element, wherein said portion of electronic text is not identical to said outline element.

14. The method of claim 1, wherein said outline refers to several distinct electronic texts.

15. The method of claim 1, wherein said electronic text is reformatted for presentation on said computer display.

16. The method of claim 1, wherein the elements of text that comprise said outline correspond to the structure of said electronic text.

17. The method of claim 1, wherein said outline is computer-generated using said electronic text as input.

18. The method of claim 1, wherein at least one outline element contains a hyperlink.

19. A computer memory storage device encoded with a computer program for using a computer system to display electronic text, comprising:

a. means for, on a display controlled by the computer system, presenting a portion of an electronic text and a portion of an outline of said electronic text, wherein:

i. an element of the text comprises at least one phrase appearing in said electronic text, said at least one phrase comprising at least one word;

ii. said outline comprises a plurality of elements, wherein elements of the outline comprise copies of elements of said electronic text;

iii. each element of the outline represents a portion of said electronic text;

iv. the combined elements of the outline comprise substantially less text than the entire said electronic text;

v. substantially all portions of said electronic text are represented by at least one element of the outline;

vi. at least one outline element is hierarchically superior to at least two other outline elements, indicating that said hierarchically superior outline element represents text also represented by said at least two other outline elements;

vii. the relative positional and hierarchical relationships of elements of the outline correspond to the relative positional and hierarchical relationships of the portions of said electronic text represented by said elements of the outline; and viii. said presented portion of said outline is presented on said display in a distinct screen region different from the screen region in which said portion of electronic text is presented; and b. means for detecting a change in display location within said electronic text, wherein:

i. said display location represents a location of said electronic text that is presented on said computer display; and ii. said change in display location is from a text location corresponding to a first outline element presented in said distinct region of step a.viii, to a text location corresponding to a second outline element initially not presented in said distinct region of step a.viii; and c. means for displaying said second outline element in said distinct region of step a.viii, wherein:

the relative positional and hierarchical relationships of elements of the outline displayed on said distinct region of step a.viii correspond to their positional and hierarchical relationships in said outline.

20. A computer system for displaying electronic text, comprising:

a. a display device controlled by the computer, said display device imaging a portion of electronic text controlled by the computer system;

b. means for, on said display controlled by the computer system, presenting a portion of an electronic text and a portion of an outline of said electronic text, wherein:
  i. an element of the text comprises at least one phrase appearing in said electronic text, said at least one phrase comprising at least one word;
  ii. said outline comprises a plurality of elements, wherein elements of the outline comprise copies of elements of said electronic text;
  iii. each element of the outline represents a portion of said electronic text;
  iv. the combined elements of the outline comprise substantially less text than the entire said electronic text;
  v. substantially all portions of said electronic text are represented by at least one element of the outline;
  vi. at least one outline element is hierarchically superior to at least two other outline elements, indicating that said hierarchically superior outline element represents text also represented by said at least two other outline elements;
  vii. the relative positional and hierarchical relationships of elements of the outline correspond to the relative positional and hierarchical relationships of the portions of said electronic text represented by said elements of the outline; and
  viii. said presented portion of said outline is presented on said display in a distinct screen region different from the screen region in which said portion of electronic text is presented; and
c. means for detecting a change in display location within said electronic text, wherein:
  i. said display location represents a location of said electronic text that is presented on said computer display; and
  ii. said change in display location is from a text location corresponding to a first outline element presented in said distinct region of step a.viii, to a text location corresponding to a second outline element initially not presented in said distinct region of step a.vii; and
d. means for displaying said second outline element in said distinct region of step b.viii, wherein:
  the relative positional and hierarchical relationships of elements of the outline displayed on said distinct region of step b.viii correspond to their positional and hierarchical relationships in said outline.

* * * * *